United States Patent
Yamada et al.

(10) Patent No.: US 7,843,868 B2
(45) Date of Patent: Nov. 30, 2010

(54) SERVICE QUALITY MANAGEMENT DEVICE AND SERVICE QUALITY MANAGEMENT METHOD

(75) Inventors: Hitoshi Yamada, Tokyo (JP); Akiko Yamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1076 days.

(21) Appl. No.: 11/472,983

(22) Filed: Jun. 22, 2006

(65) Prior Publication Data
US 2007/0230346 A1 Oct. 4, 2007

(30) Foreign Application Priority Data
Mar. 28, 2006 (JP) .............................. 2006-087956

(51) Int. Cl.
  *H04B 7/204* (2006.01)
(52) U.S. Cl. .................. 370/325; 370/230; 370/400; 370/238
(58) Field of Classification Search ................ 370/325, 370/400
See application file for complete search history.

(56) References Cited

U.S. PATENT DOCUMENTS

| | | | | |
|---|---|---|---|---|
| 5,241,686 | A * | 8/1993 | Charbonnier | 455/453 |
| 6,154,655 | A * | 11/2000 | Borst et al. | 455/451 |
| 6,584,189 | B1 * | 6/2003 | Hansen et al. | 379/221.02 |
| 6,594,268 | B1 * | 7/2003 | Aukia et al. | 370/400 |
| 6,760,314 | B1 | 7/2004 | Iwata | |
| 7,058,802 | B1 * | 6/2006 | Epstein et al. | 713/150 |
| 7,277,393 | B1 * | 10/2007 | Jacobson et al. | 370/238 |
| 7,457,240 | B2 * | 11/2008 | Oki et al. | 370/230 |
| 7,616,928 | B2 * | 11/2009 | Blume | 455/67.11 |
| 2001/0037401 | A1 * | 11/2001 | Soumiya et al. | 709/232 |
| 2002/0051449 | A1 * | 5/2002 | Iwata | 370/389 |
| 2002/0052942 | A1 * | 5/2002 | Swildens et al. | 709/223 |
| 2003/0115073 | A1 * | 6/2003 | Todd et al. | 705/1 |
| 2003/0135645 | A1 | 7/2003 | Oki et al. | |

(Continued)

FOREIGN PATENT DOCUMENTS

JP 2000-286896 10/2000

(Continued)

OTHER PUBLICATIONS

Notice of Reason for Rejection dated Jul. 13, 2010, from the corresponding Japanese Application.

*Primary Examiner*—Rafael Pérez-Gutiérrez
*Assistant Examiner*—Issam Chakour
(74) *Attorney, Agent, or Firm*—Katten Muchin Rosenman LLP

(57) ABSTRACT

A service quality management device, preventing deterioration of a quality of a communication service provided on a network while effectively utilizing network resources by managing the quality of the communication, comprises an information acquiring unit acquiring service information containing information about each of sessions for the communication service and the network configuration information, an information generation unit generating a traffic volume of each of the sessions, a route determination unit determining a packet route for each of the sessions based on the respective information, a calculation unit calculating a traffic volume and a load of each of the links based on the traffic volume of each of the sessions and the packet route for each of the sessions, and a quality judging unit judging a quality of service actualized by each of the sessions based on the calculated load of each of the links.

7 Claims, 20 Drawing Sheets

U.S. PATENT DOCUMENTS

| | | |
|---|---|---|
| 2003/0156543 A1 | 8/2003 | Sahinoglu et al. |
| 2004/0078138 A1* | 4/2004 | Nishimori .................. 701/201 |
| 2006/0067213 A1* | 3/2006 | Evans et al. ................. 370/229 |
| 2006/0109787 A1* | 5/2006 | Strutt et al. ................. 370/235 |
| 2006/0109815 A1* | 5/2006 | Ozer et al. .................. 370/329 |

FOREIGN PATENT DOCUMENTS

| | | |
|---|---|---|
| JP | 2001-24699 | 1/2001 |
| JP | 2001-320420 | 11/2001 |
| JP | 2002-300185 | 10/2002 |
| JP | 2003-209568 | 7/2003 |
| JP | 2005-518716 | 6/2005 |
| JP | 2006-060417 | 3/2006 |

* cited by examiner

FIG. 2

| TRANSMITTING TERMINAL | RECEIVING TERMINAL | STARTING TIME | TERMINATION TIME |
|---|---|---|---|
| USER TERMINAL 11 | USER TERMINAL 13 | 05/12/01 09:25:30 | 05/12/01 09:28:45 |
| USER TERMINAL 11 | USER TERMINAL 14 | 05/12/01 09:25:42 | 05/12/01 09:43:18 |
| USER TERMINAL 12 | USER TERMINAL 13 | 05/12/01 09:25:44 | 05/12/01 09:25:55 |
| .. | .. | .. | .. |

FIG. 4

| ROUTER | CONNECTION LINK NAME | SOURCE IP ADDRESS | DESTINATION IP ADDRESS | PHYSICAL BANDWIDTH | COST VALUE | TRAFFIC VOLUME | LOAD |
|---|---|---|---|---|---|---|---|
| R 1 | LINK1-0 | 10.1.0.1 | ACCESS AREA A | 1[Gbps] | — | 86[Mbps] | 8.6% |
| | LINK1-2 | 10.1.2.1 | 10.1.2.2 | 100[Mbps] | 1 | 45[Mbps] | 45% |
| | LINK1-3 | 10.1.3.1 | 10.1.3.3 | 100[Mbps] | 1 | 23[Mbps] | 23% |
| | LINK1-4 | 10.1.4.1 | 10.1.4.4 | 100[Mbps] | 1 | 18[Mbps] | 18% |
| .. | .. | .. | .. | .. | .. | .. | |

FIG. 5

| ORIGINATING AREA | TERMINATING AREA | TRAFFIC VOLUME | ROUTE INFORMATION | REGULATION RATE | POST-REGULATION TRAFFIC VOLUME |
|---|---|---|---|---|---|
| ACCESS AREA A | ACCESS AREA C | 80 [Mbps] | R1-R4-R7 | 0 | — |
| ACCESS AREA A | ACCESS AREA D | 70 [Mbps] | R1-R4-R8 | 0 | — |
| ACCESS AREA B | ACCESS AREA C | 60 [Mbps] | R2-R4-R7 | 0 | — |
| .. | .. | .. | .. | | |

FIG. 6

```
INVITE sip:200@ccc.com SIP/2.0
From: sip:100@aaa.com
To: sip:200@ccc.com
Call-ID: 12345@aaa.com
    ⋮
    ⋮
```

FIG. 8

| ROUTER | CONNECTION LINK NAME | SOURCE IP ADDRESS | DESTINATION IP ADDRESS | PHYSICAL BANDWIDTH | COST VALUE | TRAFFIC VOLUME | LOAD |
|---|---|---|---|---|---|---|---|
| R1 | LINK1-2 | 10.1.2.1 | 10.1.2.2 | 100[Mbps] | 1 | 0 | 0 |
|  | LINK1-3 | 10.1.3.1 | 10.1.3.2 | 100[Mbps] | 1 | 0 | 0 |
|  | LINK1-4 | 10.1.4.1 | 10.1.4.2 | 100[Mbps] | 1 | 150[Mbps] | 150% |
| R2 | LINK2-4 | 10.1.24.1 | 10.1.24.2 | 100[Mbps] | 1 | 60[Mbps] | 60% |
|  | LINK2-5 | 10.1.25.1 | 10.1.25.2 | 100[Mbps] | 1 | 0 | 0 |
| R3 | LINK3-6 | 10.1.36.1 | 10.1.36.2 | 100[Mbps] | 1 | 0 | 0 |
| R4 | LINK4-7 | 10.1.47.1 | 10.1.47.2 | 100[Mbps] | 1 | 140[Mbps] | 140% |
|  | LINK4-8 | 10.1.48.1 | 10.1.48.2 | 100[Mbps] | 1 | 70[Mbps] | 70% |
| R5 | LINK5-8 | 10.1.58.1 | 10.1.58.2 | 100[Mbps] | 1 | 0 | 0 |
| R6 | LINK6-7 | 10.1.67.1 | 10.1.67.2 | 100[Mbps] | 1 | 0 | 0 |
| R7 | LINK7-8 | 10.1.78.1 | 10.1.78.2 | 100[Mbps] | 1 | 0 | 0 |
| R8 | LINK8-7 | 10.1.87.1 | 10.1.87.2 | 100[Mbps] | 1 | 0 | 0 |
| .. | .. | .. | .. | .. | .. | .. | .. |

FIG. 9

| ROUTER | CONNECTION LINK NAME | SOURCE IP ADDRESS | DESTINATION IP ADDRESS | PHYSICAL BANDWIDTH | COST VALUE | TRAFFIC VOLUME | LOAD |
|---|---|---|---|---|---|---|---|
| R1 | LINK1-2 | 10.1.2.1 | 10.1.2.2 | 100[Mbps] | 1 | 0 | 0 |
|  | LINK1-3 | 10.1.3.1 | 10.1.3.2 | 100[Mbps] | 1 | 80[Mbps] | 80% |
|  | LINK1-4 | 10.1.4.1 | 10.1.4.2 | 100[Mbps] | 2 | 70[Mbps] | 70% |
| R2 | LINK2-4 | 10.1.24.1 | 10.1.24.2 | 100[Mbps] | 1 | 60[Mbps] | 60% |
|  | LINK2-5 | 10.1.25.1 | 10.1.25.2 | 100[Mbps] | 1 | 0 | 0 |
| R3 | LINK3-6 | 10.1.36.1 | 10.1.36.2 | 100[Mbps] | 1 | 80[Mbps] | 80% |
| R4 | LINK4-7 | 10.1.47.1 | 10.1.47.2 | 100[Mbps] | 2 | 60[Mbps] | 60% |
|  | LINK4-8 | 10.1.48.1 | 10.1.48.2 | 100[Mbps] | 1 | 70[Mbps] | 70% |
| R5 | LINK5-8 | 10.1.58.1 | 10.1.58.2 | 100[Mbps] | 1 | 0 | 0 |
| R6 | LINK6-7 | 10.1.67.1 | 10.1.67.2 | 100[Mbps] | 1 | 80[Mbps] | 80% |
| R7 | LINK7-8 | 10.1.78.1 | 10.1.78.2 | 100[Mbps] | 1 | 0 | 0 |
| R8 | LINK8-7 | 10.1.87.1 | 10.1.87.2 | 100[Mbps] | 1 | 0 | 0 |
| ⋮ | ⋮ | ⋮ | ⋮ | ⋮ | ⋮ | ⋮ | ⋮ |

FIG. 11

| ORIGINATING AREA | TERMINATING AREA | TRAFFIC VOLUME | ROUTE INFORMATION | REGULATION RATE | POST-REGULATION TRAFFIC VOLUME |
|---|---|---|---|---|---|
| ACCESS AREA A | ACCESS AREA C | 80 [Mbps] | R1-R3-R6-R7 | 0 | — |
| ACCESS AREA A | ACCESS AREA D | 70 [Mbps] | R1-R4-R8 | 0 | — |
| ACCESS AREA B | ACCESS AREA C | 60 [Mbps] | R2-R4-R7 | 0 | — |
| .. | .. | .. | .. | | |

FIG. 13

| ORIGINATING AREA | TERMINATING AREA | TRAFFIC VOLUME | ROUTE INFORMATION | REGULATION RATE | POST-REGULATION TRAFFIC VOLUME |
|---|---|---|---|---|---|
| ACCESS AREA A | ACCESS AREA C | 120[Mbps] | R1-R3-R6-R7 | 0.3 | 84[Mbps] |
| ACCESS AREA A | ACCESS AREA D | 70[Mbps] | R1-R4-R8 | 0 | — |
| ACCESS AREA B | ACCESS AREA C | 60[Mbps] | R2-R4-R7 | 0 | — |
| .. | .. | .. | .. | | |

FIG. 14

| ROUTER | CONNECTION LINK NAME | SOURCE IP ADDRESS | DESTINATION IP ADDRESS | PHYSICAL BANDWIDTH | COST VALUE | TRAFFIC VOLUME | LOAD |
|---|---|---|---|---|---|---|---|
| R1 | LINK 1-2 | 10.1.2.1 | 10.1.2.2 | 100[Mbps] | 1 | 0 | 0 |
|  | LINK 1-3 | 10.1.3.1 | 10.1.3.2 | 100[Mbps] | 1 | 120[Mbps] | 120% |
|  | LINK 1-4 | 10.1.4.1 | 10.1.4.2 | 100[Mbps] | 2 | 70[Mbps] | 70% |
| R2 | LINK 2-4 | 10.1.24.1 | 10.1.24.2 | 100[Mbps] | 1 | 60[Mbps] | 60% |
|  | LINK 2-5 | 10.1.25.1 | 10.1.25.2 | 100[Mbps] | 1 | 0 | 0 |
| R3 | LINK 3-6 | 10.1.36.1 | 10.1.36.2 | 100[Mbps] | 1 | 120[Mbps] | 120% |
| R4 | LINK 4-7 | 10.1.47.1 | 10.1.47.2 | 100[Mbps] | 2 | 60[Mbps] | 60% |
|  | LINK 4-8 | 10.1.48.1 | 10.1.48.2 | 100[Mbps] | 1 | 70[Mbps] | 70% |
| R5 | LINK 5-8 | 10.1.58.1 | 10.1.58.2 | 100[Mbps] | 1 | 0 | 0 |
| R6 | LINK 6-7 | 10.1.67.1 | 10.1.67.2 | 100[Mbps] | 1 | 120[Mbps] | 120% |
| R7 | LINK 7-8 | 10.1.78.1 | 10.1.78.2 | 100[Mbps] | 1 | 0 | 0 |
| R8 | LINK 8-7 | 10.1.87.1 | 10.1.87.2 | 100[Mbps] | 1 | 0 | 0 |
| .. | .. | .. | .. | .. | .. | .. | .. |

FIG. 15

| ROUTER | CONNECTION LINK NAME | SOURCE IP ADDRESS | DESTINATION IP ADDRESS | PHYSICAL BANDWIDTH | COST VALUE | TRAFFIC VOLUME | LOAD |
|---|---|---|---|---|---|---|---|
| R1 | LINK 1-2 | 10.1.2.1 | 10.1.2.2 | 100[Mbps] | 1 | 0 | 0 |
|  | LINK 1-3 | 10.1.3.1 | 10.1.3.2 | 100[Mbps] | 1 | 84[Mbps] | 84% |
|  | LINK 1-4 | 10.1.4.1 | 10.1.4.2 | 100[Mbps] | 2 | 70[Mbps] | 70% |
| R2 | LINK 2-4 | 10.1.24.1 | 10.1.24.2 | 100[Mbps] | 1 | 60[Mbps] | 60% |
|  | LINK 2-5 | 10.1.25.1 | 10.1.25.2 | 100[Mbps] | 1 | 0 | 0 |
| R3 | LINK 3-6 | 10.1.36.1 | 10.1.36.2 | 100[Mbps] | 1 | 84[Mbps] | 84% |
| R4 | LINK 4-7 | 10.1.47.1 | 10.1.47.2 | 100[Mbps] | 2 | 60[Mbps] | 60% |
|  | LINK 4-8 | 10.1.48.1 | 10.1.48.2 | 100[Mbps] | 1 | 70[Mbps] | 70% |
| R5 | LINK 5-8 | 10.1.58.1 | 10.1.58.2 | 100[Mbps] | 1 | 0 | 0 |
| R6 | LINK 6-7 | 10.1.67.1 | 10.1.67.2 | 100[Mbps] | 1 | 84[Mbps] | 84% |
| R7 | LINK 7-8 | 10.1.78.1 | 10.1.78.2 | 100[Mbps] | 1 | 0 | 0 |
| R8 | LINK 8-7 | 10.1.87.1 | 10.1.87.2 | 100[Mbps] | 1 | 0 | 0 |
| .. | .. | .. | .. | .. | .. | .. | .. |

FIG. 20

| ORIGINATING AREA | TERMINATING AREA | TRAFFIC VOLUME | ROUTE INFORMATION | REGULATION RATE | POST-REGULATION TRAFFIC VOLUME | EXECUTION SCHEDULE |
|---|---|---|---|---|---|---|
| ACCESS AREA A | ACCESS AREA C | 120[Mbps] | R1-R3 -R6-R7 | 0.3 | 84[Mbps] | — |
| ACCESS AREA A | ACCESS AREA D | 70[Mbps] | R1-R4-R8 | 0 | — | — |
| ACCESS AREA B | ACCESS AREA C | 60[Mbps] | R2-R4-R7 | 0 | — | — |
| ACCESS AREA A | ACCESS AREA C | 100[Mbps] | | 0 | — | 2006/03/20 |
| ACCESS AREA A | ACCESS AREA D | 60[Mbps] | | 0 | — | 2006/03/20 |
| ACCESS AREA B | ACCESS AREA C | 40[Mbps] | | 0 | — | 2006/03/20 |
| .. | .. | .. | .. | | | | and SERVICE QUALITY MANAGEMENT DEVICE AND SERVICE QUALITY MANAGEMENT METHOD

BACKGROUND OF THE INVENTION

1. Field of the Invention

The present invention relates to a service quality management device and to a service quality management method that manage a quality of a communication service provided on a network.

2. Description of the Related Art

In a case where an application server provides a predetermined service to other nodes (user terminals etc) on the network, it is general to conduct acceptance control as control for maintaining the quality of the service to be provided. The acceptance control connoted herein is that it is judged based on a predetermined condition whether a request for the service can be accepted or not. For instance, when a SIP (Session Initiation Protocol) server provides a VoIP (Voice over Internet Protocol) service, the quality of service (QoS) is maintained in a way that prevents simultaneous connections for a fixed or greater number of calls as requests for the service by an acceptance control function of the SIP server or the acceptance control function of a product called a session border controller (acceptance control).

This type of conventional acceptance control is to reject the acceptance if there are requests exceeding a present network transfer capacity for the service, but is not a scheme for improving the network transfer capacity for the service request. In other words, the conventional acceptance control results in restricting a number of services provided to users in order to maintaining the quality of service.

On the other hand, as technologies of improving the network transfer capacity, there are a technology (refer to Patent document 1 given below) of improving a throughput by distributing the traffic to a plurality of routes and a technology (refer to Patent document 2 given below) of equalizing loads of respective links in a way that changes routing metric of the respective links by a load sharing server targeting at an IP network. Note that the conventional art related to the present invention of the application is disclosed in the following documents. The conventional art documents are "Japanese Patent Application Laid-Open Publication No. 2001-320420" (Patent document 1), "Japanese Patent Application Laid-Open Publication No. 2001-24699" (Patent document 2), "Japanese Unexamined Patent Publication No. 2005-518716" (Patent document 3) and "Japanese Patent Application Laid-Open Publication No. 2000-286896" (Patent document 4).

In regard to the conventional arts described above, a service provider who wishes to improve profits from providing the services and a degree of satisfaction of the user or a network provider who wishes to effectively utilize the network, has a demand for providing the services to as many users as possible. Further, there is a demand for improving the quality of service with respect to only a certain limited service among the services provided on the network.

The conventional acceptance control technologies having no alternative but to restrict a number of the provided service in order to maintain the quality of service are hard to meet these demands. Moreover, the technology disclosed in Patent document 1 given above targets at a connection-oriented network as by MPLS (Multi-Protocol Label Switching) and therefore has a problem of being unable to be applied to the IP network.

Still further, the technology disclosed in Patent document 2 given below conducts the load sharing control without taking the service into consideration and therefore has a necessity of grasping demand information representing a service request distribution in order to improve the quality in the way of being limited to the specified service. The grasp of the demand information, however, needs observing all the pass-through packets in the routers within the network, resulting in a problem of being hard to actualize in a large-scale network.

SUMMARY OF THE INVENTION

It is an object of the present invention, which was devised in view of problems described above, to provide a service quality management device and a service quality management method that prevent deterioration of the quality of the communication service provided on the network while effectively utilizing network resources.

The present invention adopts the following configurations in order to solve the above-mentioned problems. Namely, the present invention is a service quality management device for managing a quality of a communication service provided in a network as management target, comprising a service information acquiring unit acquiring service information containing information about each of sessions for the communication service, a network configuration information acquiring unit acquiring network configuration information about the network, an information generation unit generating a traffic volume of each of the sessions on the basis of the service information, a route determination unit determining a packet route for each of the sessions on the basis of the service information and the network configuration information, a traffic calculation unit calculating a traffic volume of each of links in the network on the basis of the traffic volume of each of the sessions and the packet route for each of the sessions, a load calculation unit calculating load of each of the links on the basis of the calculated traffic volume of each of the links, and a quality judging unit judging a quality of service actualized by each of the sessions on the basis of the calculated load of each of the links.

In the present invention, the traffic volume of each of the sessions that is defined as a unit for providing the communication service and the packet route for each of the sessions are respectively calculated from the service information (the demand information) about the communication service provided in the network as management target and from the network configuration information. The session connoted herein indicates a connection established solely between the terminals utilizing the communication service or between access areas, and can be otherwise termed a service connection, a demand, etc. Then, the traffic volume of each of the links in the management target network is calculated based on the calculated traffic volume and on the calculated packet route about each session, and further the load of each session is calculated. Finally, the quality (the quality of service (QoS)) of each session is judged corresponding to the calculated load of each link.

This configuration enables automatic management of the quality of the specified communication service provided on the management target network. As a matter of course, if the service information acquired by the service information acquiring unit is narrowed down to the specified communication service, it is possible to manage the quality of only this specified communication service.

Therefore, according to the present invention, it is possible to prevent deterioration of the quality of the communication service provided on the network, and further, though the service provider or the network provider have hitherto been required to monitor the quality of service of each session, the present invention is capable of reducing both of the number of such processes and a cost for the operation.

Moreover, the route determination unit may extract, for each of session, a link configuration between relay devices connecting each of session-connected terminals to the network and a cost value of each link from the service information and from the network configuration information, and may determine each of packet routes for each of the sessions in the network on the basis of the extracted link configuration and the extracted cost value of each link. Further, the quality judging unit may judge that the quality of service actualized by each session is deteriorated if the load of at least one link in the links included in the packet route for the session exceeds a predetermined threshold value.

In the present invention, a cost value of each of the links extracted from the network configuration information is referred to when determining the packet route of each session. In the relay device in the network, the packet route for each session is determined from the route information based on a routing protocol, however, a normal type of IP network uses in many cases a link state routing protocol such as OSPF (Open Shortest Path First) and IS-IS (Intermediate System to Intermediate System). In this routing, the cost value is defined in each link, and a route minimizing a sum of the cost values of the links via which to reach a destination is selected. The route determination unit according to the present invention determines the packet route for each session on the basis of the same information (the cost value of each link) as by a routing algorithm carried out in the actual relay device. Further, the deterioration of the quality of service is judged from knowing whether the link load calculated based on the thus-determined packet route for each session exceeds a predetermined threshold value or not. If the link having the high load exists, the traffic for the session can not be all passed through this link, resulting in deterioration of the quality of the communication service actualized by the session utilizing this link.

Thus, according to the present invention, the quality of service is judged based on the same contents (the packet route for each session, the load of each link, etc) as the contents actually controlled in the relay device in the management target network, and it is therefore feasible to actualize the highly accurate judgment about the quality of service.

Further, the service quality management device according to the present invention may further comprise a changing unit changing, if the quality of service of even any one of the sessions is judged to be deteriorated, at least one of the cost values of the respective links. Still further, the changing unit may determine an optimal cost value of each link so that the qualities of services of all the sessions are not deteriorated by making the quality judging unit judge the quality of service once again on the basis of the changed cost value.

This changing unit, when judging that the quality of service of even any one of the sessions is deteriorated, assumes a possibility that the loads are concentrated on the specified link due to an improper cost value of the link, and changes at least one of the cost values of the respective links. Moreover, for determining the optimal cost value of each link, the judgment about the quality of service is again executed based on the changed cost value. In the re-judgment about the quality of service, the packet route is re-determined based on the changed cost value, and the traffic volume and the load of each link are recalculated.

Thus, according to the present invention, it is possible to determine a link cost value so as to improve the quality of service in the network by sharing the loads within the network.

Further, the service quality management device according to present invention may further comprise a regulation unit determining at least one of the sessions as a session of which acceptance should be regulated, wherein the information generation unit may regenerate a traffic volume regulated with respect to the should-be-acceptance-regulated session, and the changing unit may determine the optimal cost value of each link by making the quality judging unit again judge the quality of service on the basis of the regulated traffic volume and the changed cost value.

When a total quantity of the sessions is large, there is a case of being unable to accept all the sessions no matter how the link costs are changed. In the present invention, in such a case, the acceptance of the sessions is restricted at a predetermined rate, thereby obtaining the optimal cost value of each of the links capable of accepting the sessions with the traffic volumes reduced. This scheme enables the quality of service for each session to be maintained with respect to the service provided after regulating the service.

Moreover, the service quality management device according to present invention may further comprise a setting unit setting the optimal cost value of each link and regulation information about the should-be-acceptance-regulated session in predetermined devices in the network.

With this scheme, the information managed the service quality can be reflected in the network, and it is therefore possible to reduce the man-hour for management in the network and to set the information judged to enable the quality to be maintained, whereby the quality of service can be maintained while effectively utilizing the network resources.

Furthermore, the service information acquiring unit may acquire the service information from a connection log outputted by a server that provides the communication service, or may acquire the service information from a service request packet transmitted to the server that provides the communication service. Still further, the network configuration information acquiring unit may acquire the network configuration information from a relay device disposed in the network.

Generally, the application server providing the service outputs, as the connection log, the information about each terminal provided with the service in response to every service request. Hence, the service information can be automatically acquired by analyzing these items of information obtained from this connection log. Moreover, the same items of information as those from the connection log can be acquired by capturing and analyzing a packet as a request message to the server. Yet further, an operator may manually input the service information by making a prediction from statistic information in the past.

It should be noted that the present invention may be a program for actualizing any one of the functions described above. Further, the present invention may also be a readable-by-computer storage medium recorded with such a program.

According to the present invention, it is possible to actualize the service quality management device that prevents the deterioration of the quality of the communication service provided on the network while effectively utilizing the network resources.

BRIEF DESCRIPTION OF THE DRAWINGS

FIG. 2 is a diagram showing an example of a connection log;

FIG. 4 is a diagram showing a network configuration information table;

FIG. 5 is a diagram showing a demand information table;

FIG. 6 is a diagram showing a SIP-based service request message;

FIG. 8 is a diagram showing a setting example of the network configuration information table in the initial network status;

FIG. 9 is a diagram showing a setting example of the network configuration information table after changing a cost value;

FIG. 11 is a diagram showing a setting example of a demand information table after changing the cost value;

FIG. 13 is a diagram showing a setting example of the demand information table after increasing a traffic volume;

FIG. 14 is a diagram showing a setting example of the network configuration information table after increasing the traffic volume;

FIG. 15 is a diagram showing a setting example of the network configuration information table after regulating a demand;

FIG. 20 is a diagram showing a modified example of the demand information table;

DESCRIPTION OF THE PREFERRED EMBODIMENTS

[Embodiment]

A service quality management device according to an embodiment of the present invention will hereinafter be described with reference to the drawings. A configuration in the following embodiment is an exemplification, and the present invention is not limited to the configuration in the embodiment.

[Network Configuration]

Figure 1:
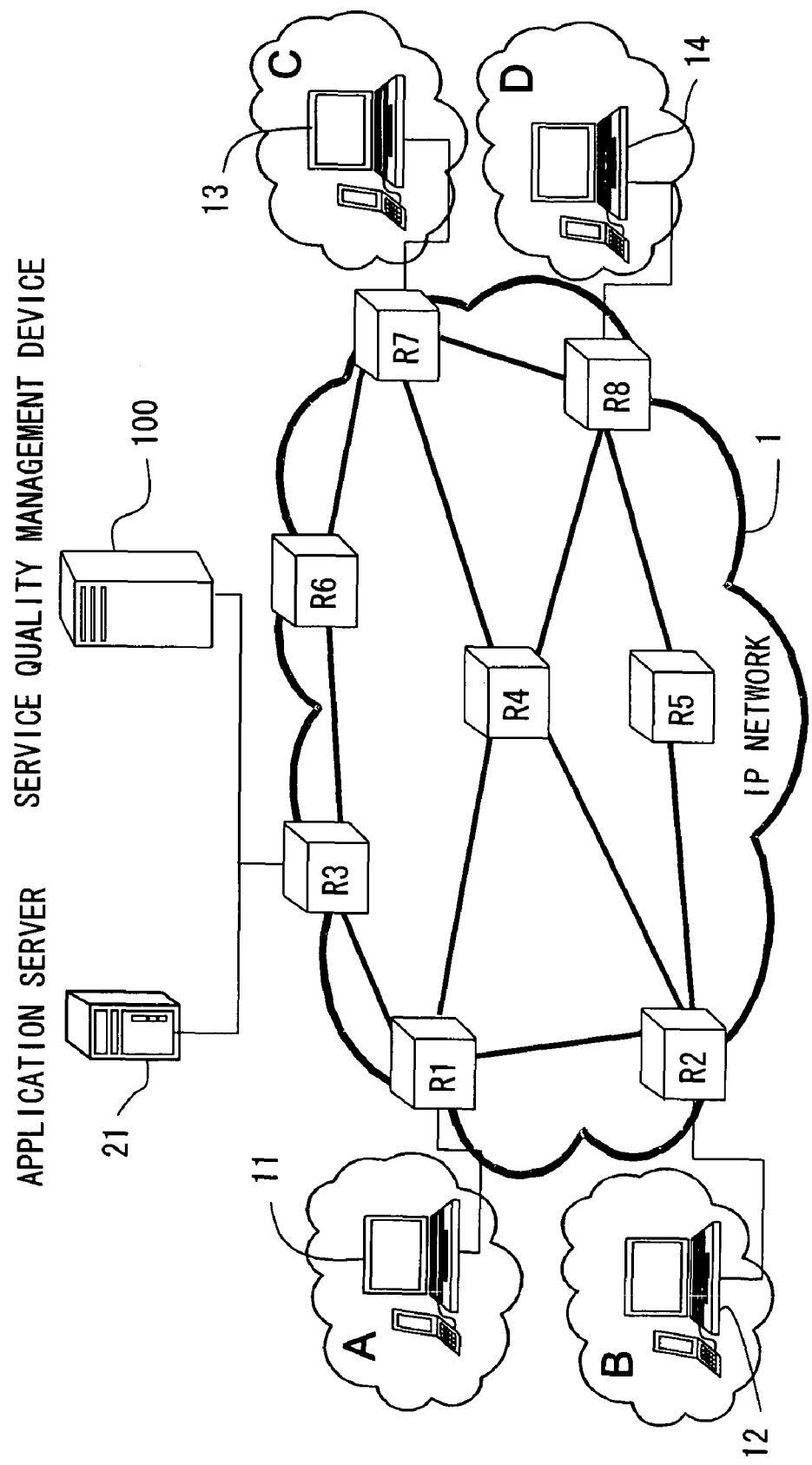
FIG. 1 is a diagram showing a network configuration in the embodiment.

To begin with, a configuration of a network controlled by the service quality management device according to the embodiment will be explained with reference to FIG. 1. FIG. 1 is a view showing the network configuration in the embodiment. As depicted in FIG. 1, the network in the embodiment is configured by access areas A, B, C and D, and by an IP network 1. The IP network 1 is built up by connecting a plurality of routers (routers R1 through R8 are given by way of an example) via a predetermined link. Further, each of the access areas A, B, C and D is connected to any one (border router) of the plural routers within the IP network 1 and is thereby provided with a communication service provided on the IP network 1. Specifically, the access area A is connected to the router R1, the access area B is connected to the router R2, the access area C is connected to the router R7, and the access area D is connected to the router R8.

The access areas A, B, C and D are local area networks each configured based on a predetermined protocol, and are exemplified such as an IP network, a wireless LAN and a public switched telephone network (PSTN). The present invention limits neither the protocols etc utilized in these respective access areas nor wired communications/wireless communications. The configuration shall be sufficient on condition that individual user terminals 11, 12, 13 and 14 connected to the respective access areas are connectable to the IP network 1.

The user terminals 11, 12, 13 and 14 are terminals each having a predetermined communication function and are exemplified such as a cell phone, an IP phone, a personal computer and a PDA (Personal Digital Assistant). The present invention limits neither a hardware architecture nor a software architecture of each of these respective user terminals, and the user terminal may be enough if having the communication function capable of receiving an application service provided by an application server 21.

The application server 21 and a service quality management device 100 according to the embodiment are connected to the IP network 1 via the router R3. The application server 21 provides a predetermined communication service to the user terminals connected to the IP network 1. The communication service is exemplified such as a VoIP (IP telephony) service for providing voice communications on the IP network, a TV telephony service for providing video-attached voice communications, a streaming service for distributing video pictures and a Web service enabling a software function to be utilized via the network. The application server 21 provides at least one of these communication services. It is to be noted that the application server 21 may be a general-purpose computer such as a personal computer and may also be a dedicated computer. The present invention limits neither a hardware architecture nor a software architecture of the application server 21, and the application server 21 may be sufficient if having a configuration capable of providing the communication service to the user terminal via the IP network 1.

Further, the application server 21 manages each session about the service to be provided, and records the management information thereof in a connection log each time. For instance, the application server 21 records items of information such as a transmitting terminal, a receiving terminal and talk time with respect to each session in the connection log each time. FIG. 2 is a diagram showing an example of the connection log retained in the application server 21. Normally, when starting the VoIP service, the user terminal on the transmitting side sends an initiation request message to the application server 21, and the application server 21 receiving this initiation request message sets up a call for the designated user terminal on the receiving side, thereby providing the VoIP service. Further, when terminating the VoIP service, the user terminal sends a termination request to the application server 21. The application server 21 records the management information about each session in the connection log. Accordingly, the connection log stores the information such as a transmitting terminal, a receiving terminal, initiation time and termination time with respect to each session as shown in FIG. 2.

The service quality management device 100 performs control for maintaining a quality of a specified communication service in the communication services provided by the application server 21. The quality of service (QoS) connoted herein is an index showing whether or not the user terminal can properly receive the communication service. A method of maintaining the quality of service may be to reduce a loss, a delay, etc of IP packets that achieve the communication service. Further, the number of control target services of the service quality management device 100 is not restricted. The quality control target of the service quality management device 100 shall be the VoIP service actualized by utilizing the SIP (Session Initiation Protocol). Namely, the application server 21 shall be configured as a SIP server that manages the session for the voice talk.

Moreover, as for traffic flowing across the IP network 1 to which the service quality management device 100 is connected, traffic other than the quality control target service may also be flowed across the IP network 1. In the case of the flow of the traffic other than the quality control target service, the traffic of the control target communication service may be preferentially flowed by using a router that supports a technique such as differentiated services actualizing traffic priority control. Note that the service quality management device 100 may be a general-purpose computer such as a personal computer and may also be a dedicated computer. The present invention does not limit a hardware architecture of the service quality management device 100, and the service quality management device 100 may be sufficient on condition that the device 100 includes detailed-function units which will be given as below.

[Device Configuration]

Figure 3:
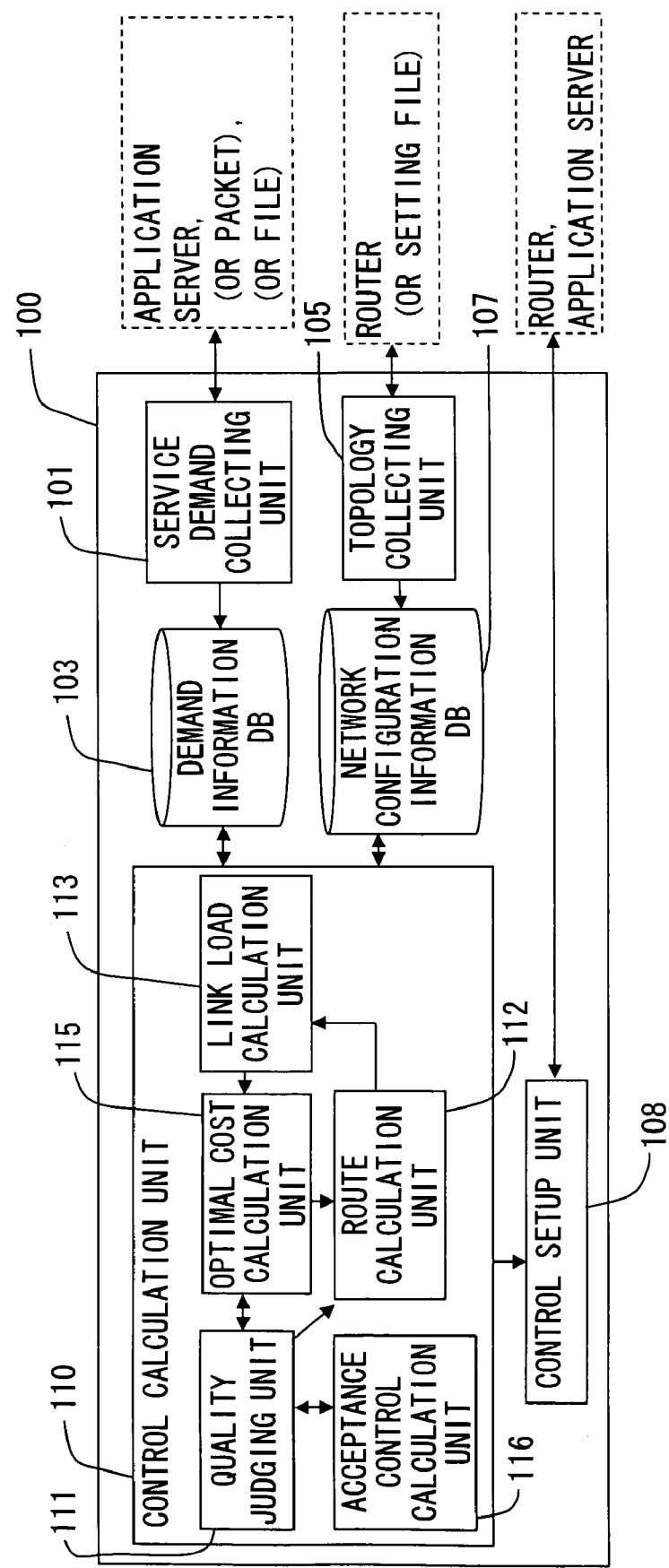
FIG. 3 is a block diagram showing a functional configuration of a service quality management device in the embodiment.

A functional configuration of the service quality management device 100 in the embodiment will be explained with reference to FIG. 3. FIG. 3 is a block diagram showing the functional configuration of the service quality management device 100 in the embodiment. The service quality management device 100 in the embodiment is configured with a service demand collecting unit 101, a demand information database (which will hereinafter simply be termed the demand information DB) 103, a topology collecting unit 105, a network configuration information database (which will hereinafter simply be termed the network configuration information DB) 107, a control setup unit 108, a control calculation unit 110, a quality judging unit 111, a route calculation unit 112, an optimal cost calculation unit 115, an acceptance control calculation unit 116, etc.

<Topology Collecting Unit>

The topology collecting unit 105 acquires the network configuration information from each of the routers configuring the IP network 1, and stores the acquired network configuration information in the network configuration information DB 107 (which corresponds to a network configuration information acquiring unit according to the present invention). The topology collecting unit 105 collects the setup information of the respective routers automatically by utilizing, e.g., TELNET protocol, thereby acquiring the network configuration information. In addition, the topology collecting unit 105 may be manually read the setup information, which the respective routers outputs to a removable media, etc., from the removable media.

<Network Configuration Information DB>

The network configuration information DB 107 stores the network configuration information acquired by the topology collecting unit 105. The network configuration information DB 107 stores the network configuration information in the form of a network configuration information table shown in FIG. 4. FIG. 4 is a diagram showing the network configuration information table. This network configuration information table stores, with respect to every router, information such as a connection link name of each link connected to the router, a source IP address, a destination IP address, a physical bandwidth, a cost value, a traffic volume, a load, etc. In the example in FIG. 4, the connection link name is defined such as [link (self-router number)-(destination router number)]. For example, [link 1-0] represents a link to the access area A from the router R1, and [link 1-2] represents a link to the router R2 from the router R1.

The network configuration information table contains definitions of the bidirectional links between the routers. For example, concerning the bidirectional links between the router R1 and the router R2, [link 1-2] is set as the link of the router R1, and [link 2-1] is set as the link of the router R2. Further, each of the routers has an IP address associated with each link to which the router is connected, and therefore each of these IP addresses is set in the source IP address field. An IP address held by the router as the link destination with respect to the link is set in the destination IP address field. Among these information stored in the network configuration information table, the information generated based on the network configuration information collected by the topology collecting unit 105 is set as the information other than the traffic volume and the load. Values calculated by the control calculation unit 110, which will hereinafter be described, are entered in the traffic volume field and in the load field.

<Service Demand Collecting Unit>

The service demand collecting unit 101 acquires the connection logs retained by the application server 21 (which corresponds to a service information acquiring unit and to an information generation unit according to the present invention). The service demand collecting unit 101 extracts the information about the session (this information will hereinafter be also referred to as demand information) related to the communication service as the quality control target from the acquired connection logs. In the embodiment, the VoIP service is the quality control target, and hence the demand information on the VoIP service is extracted from the connection log. The service demand collecting unit 101 stores the extracted demand information in the demand information DB 103. It is to be noted that in a case where the connection logs are stored separately for every communication service in the application server 21, such a scheme may also be taken that the service demand collecting unit 101 acquires only the connection logs related to the service as the quality control target.

The service demand collecting unit 101, in the case of acquiring, e.g., the connection log shown in FIG. 2, extracts the information such as the IP address in regard to the transmitting terminal and the information such as the IP address in regard to the receiving terminal from the connection log. The service demand collecting unit 101, based on the extracted IP addresses etc related to the transmitting terminal and the receiving terminal, organizes the demand information as inter-area information between the area (originating area) to which the transmitting terminal belongs and the area (terminating area) to which the receiving terminal belongs. For instance, in the case of acquiring the connection log illustrated in FIG. 2, the demand information DB 103 stores the demand information as a demand between the originating area A and the terminating area C in which the originating area is the access area A to which the user terminal 11 belongs and the terminating area is the access area C to which the user terminal 13 belongs, a demand between the originating area A and the terminating area D in which the originating area is the access area A to which the user terminal 11 belongs and the terminating area is the access area D to which the user terminal 14 belongs, and a demand between the originating area B and the terminating area C in which the originating area is the access area B to which the user terminal 12 belongs and the terminating area is the access area C to which the user terminal 13 belongs.

With this scheme, the service demand collecting unit 101 calculates each inter-area traffic volume as transmission bits per second (bps (Bits Per Second)). For instance, in the case of VoIP, each inter-area traffic volume is calculated in response to the respective demands organized by the inter-area as described above by utilizing a notion that the traffic volume per session is fixed (e.g., 80 kbps in the case of G.711, and so on) according to a type of CODEC to be used. For example, in the case of acquiring the connection log shown in FIG. 2, supposing that G.711 is utilized as the CODEC for the session (between the originating area 1 and the terminating area C) between the user terminal 11 and the user terminal 13, the traffic volume becomes 80 kbps. Thus, the service demand collecting unit 101 batchwise adds the traffic volumes for the respective sessions between the same originating area and the same terminating area, thereby setting the traffic volume for the demand between the respective areas.

Further, the service demand collecting unit 101, in place of acquiring the connection log, may acquire the demand information by capturing a message etc sent to the application server 21 from the user terminal. FIG. 6 is a diagram showing an example of capturing a SIP-based service request message. In the message depicted in FIG. 6, information about the transmitting terminal and the receiving terminal can be acquired by referring to "From" and "To", and the initiation time and the termination time can be obtained from the capturing time and a message type (a service starting request in the case of INVITE). In addition, the service demand collecting unit 101 may manually read a file, in which the demand information is stored, from the removable media etc.

<Demand Information DB>

The demand information DB 103 stores the demand information generated by the service demand collecting unit 101. The demand information DB 103 stores the demand information in the form of a demand information table illustrated in FIG. 5. The demand information table is, with respect to each demand, stored with, an originating area name, a terminating area name, a traffic volume, route information, a regulation rate, and a post-regulation traffic volume. The items of information generated by the service demand collecting unit 101 are set in the originating area name field, the terminating area name field and the traffic volume field of the demand information table. Note that route information calculated by the route calculation unit 112, which will hereinafter be described, is set in the route information field, and a regulation rate and a post-regulation traffic volume determined by the acceptance control calculation unit 116, which will hereinafter be explained, are set in the regulation rate field and in the post-regulation traffic volume field.

<Control Calculation Unit>

The control calculation unit 110 determines the control needed for maintaining the quality of the service as the quality control target. To be specific, the control calculation unit 110 determines the quality control in a way that refers to and updates the demand information DB 103 and the network configuration information DB 107, and indicates the thus-determined quality control to the control setup unit 108. The control calculation unit 110 includes, in order to actualize these functions, the quality judging unit 111, the route calculation unit 112, a link load calculation unit 113, the optimal cost calculation unit 115, the acceptance control calculation unit 116, etc.

<<Quality Judging Unit>>

The quality judging unit 111 controls the route calculation unit 112, the link load calculation unit 113, the optimal cost calculation unit 115, the acceptance control calculation unit 116 and so on, thereby determining the quality control to enable the quality of service as the quality control target to be well maintained (which corresponds to a quality judging unit according to the present invention). The quality judging unit 111, at an initial operation time, checks the quality of server at predetermined timing when the demand information table is updated due to an addition of a new demand, when the network configuration information table is updated due to an addition of a link, and so on. Specifically, the quality judging unit 111, when detecting that the demand information table or the network configuration information table is updated, instructs the route calculation unit 112 to calculate a route for each demand. With this instruction, the route calculation unit 112 calculates the route for each demand, the link load calculation unit 113 calculates a load of each link, and the optimal cost calculation unit 115 calculates an optimal cost value. Hereafter, the quality judging unit 111 waits for notification from the optimal cost calculation unit 115 and judges whether the optimal cost value can be obtained or not.

The quality judging unit 111, in the case of receiving the notification purporting that the optimal cost has been obtained from the optimal cost calculation unit 115, judges that the cost value of each link, the regulation rate of each demand, the post-regulation traffic volume, etc should be reflected in the network, and notifies the control setup unit 108 of this purport and the should-be-reflected control information.

While on the other hand, the quality judging unit 111, in the case of receiving the notification purporting that the optimal value is not obtained from the optimal cost calculation unit 115, gives an instruction of demand regulation to the acceptance control calculation unit 116. The quality judging unit 111, upon receiving the notification purporting that the update of the demand information table has been finished from the acceptance control calculation unit 116, instructs the route calculation unit 112 to recalculate the route on the basis of the post-regulation demand information. With this instruction, the route calculation unit 112 recalculates the route for each demand, the link load calculation unit 113 recalculates the load of each link, and the optimal cost calculation unit 115 recalculates the optimal cost value.

<<Optimal Cost Calculation Unit>>

The optimal cost calculation unit 115 executes control to update the cost value of the link, which is set in the network configuration information table, into the optimal cost value (which corresponds to a changing unit according to the present invention). At this time, the optimal cost calculation unit 115, as preprocessing, separately stores the information of the present network configuration information table and the information of the present demand information table, and further stores the link information having a maximum load in the separately-stored information of the network configuration information table.

The optimal cost calculation unit 115, on the occasion of calculating the optimal cost value, to begin with, changes the cost value of the predetermined link (a cost value resetting process). To be specific, the optimal cost calculation unit 115, after increasing the cost value set in the cost value field in the network configuration information table by a fixed value with respect to the link having the highest load and decreasing the cost value by a fixed value with respect to the link having the lowest load, requests the route calculation unit 112 to recalculate the route information in the demand information table on the basis of the changed cost values. The present invention does not limit the optimal cost calculation process to the process described above, and a link candidate of which the cost value should be changed may be determined from a comparison with a predetermined threshold value. In this case, the optimal cost calculation unit 115 may increase the cost value by the fixed value with respect to the link of which the load is higher than the increase threshold value, and may decrease the cost value by the fixed value with respect to the link of which the load is lower than the decrease threshold value. Note that the resetting process of the cost value is executed within a range of an upper limit value and a lower limit value, which can be taken for the cost value.

The optimal cost calculation unit 115, upon receiving notification of completion of updating the link load from the link load calculation unit 113, executes the optimal cost value judging process. In the optimal cost value judging process, the optimal cost calculation unit 115, if the maximum load of the link in a post-update status is equal to or smaller then a target value and is lower than the separately-stored maximum load of the last time, redoes the process from the above-mentioned cost value resetting process for obtaining a more optimal cost value. Further, the optimal cost calculation unit 115, in the optimal cost value judging process, if the stored maximum load of the last time is equal to or smaller than the target value and if the maximum load of the link in the post-update status gets higher than the maximum load of the last time, judges that the cost value of the last time is optimal. The target value of the maximum load may be adjustably stored in a memory etc.

The optimal cost calculation unit 115, when making the judgment of thus reaching the optimal cost value, reflects the separately-stored information of the network configuration information table and of the demand information table of the last time respectively in the network configuration information table and in the demand information table (the optimal cost calculation unit 115 sets these tables in an optimal cost value retaining status), and notifies the quality judging unit 111 of the purport of having reached the optimal cost value. While on the other hand, the optimal cost calculation unit 115, if unable to reach the optimal cost value till it comes to an upper limit trial count, notifies the quality judging unit 111 of this purport. The upper limit trial count may be stored adjustably in the memory etc.

<<Route Calculation Unit>>

The route calculation unit 112 refers to the demand information table and to the network configuration information table, and thus generates the route information on the demands between the respective areas (which corresponds to a route determination unit according to the present invention). The route calculation unit 112 obtains, in the same way as by the normal routing processed in each router, a route that minimizes a sum of the cost values of the respective links between the originating router and the terminating router, which realize the demands between the respective areas. The cost value of each link is extracted from the network configuration information table. For instance, in the case of obtaining the route for the demand between the access area A and the access area C shown in FIG. 5, the route calculation unit 112 determines, as the originating router, the router R1 serving as a border router with the access area A in the IP network 1 and determines, as the terminating router, the router R7 serving as a border router with the access area C in the IP network 1. Then, the route calculation unit 112 extracts the cost values of the respective links extending from the router R1 to the router R7 from the network configuration information table, and selects the router that minimizes the sum of the extracted cost values of the respective links. In this case, the route calculation unit 112 determines the route extending from the router R1 and reaching the router R7 via the router R4. The route calculation unit 112 sets the obtained route information in the route information field in the demand information table.

<<Link Load Calculation Unit>>

The link load calculation unit 113 refers to the route information in the demand information table which has been set by the route calculation unit 112, and thus calculates the traffic volume of each of the links within the network configuration information table (which corresponds to a traffic calculation unit and to a load calculation unit according to the present invention). The link load calculation unit 113 sets the calculated traffic volume of each link in the traffic volume field of the network configuration information table. For example, in the case of considering the traffic volumes in three records of the demand information table shown in FIG. 5, the link 1-4 (the link from the router R1 to the router R4) is used for the demand between the access area A and the access area C and for the demand between the access area A and the access area D, so that the traffic volumes for the respective demands are added, whereby the traffic volume of the link 1-4 is calculated at 150 Mbps (=80 Mbps+70 Mbps). Note that the link load calculation unit 113, with respect to the demand to be regulated, calculates the traffic volume of each link by use of the traffic volume set in the post-regulation traffic volume field in place of the value set in the traffic volume field. In this case, the demand, of which the regulation rate set in the regulation rate field is larger than "0", is judged to be the regulated demand. Values determined by the acceptance control calculation unit 116 are, as will hereinafter be explained, set in this regulation rate field and in the post-regulation traffic volume field.

The link load calculation unit 113, after updating the traffic volume of each of the links within the network configuration information table, calculates loads of all the links set in the network configuration information table. The load of each of the links is, for every link, obtained from a ratio of the traffic volume to a physical bandwidth. For instance, as for the link 1-2 in the example of the network configuration information table in FIG. 4, the traffic volume is 45 Mbps, the physical bandwidth is 100 Mbps, and hence the load is calculated at 45%. The calculated load of each link is set in the load field of the network configuration information table.

<<Acceptance Control Calculation Unit>>

The acceptance control calculation unit 116 receives a demand regulation instruction from the quality judging unit 111, and determines the should-be-regulated demand in all the demands, the regulation rate thereof and the post-regulation traffic volume (which corresponds to a regulation unit according to the present invention). The acceptance control calculation unit 116 refers to the network configuration information table, then determines the demand using a high-load link as the should-be-regulated demand, and determines the regulation rate and the post-regulation traffic volume corresponding to the load quantity thereof. To be specific, the acceptance control calculation unit 116 extracts a link with the load that exceeds a maximum load target value from the network configuration information table, and extracts a demand using this extracted link from the demand information table, thereby determining the should-be-regulated demand. Further, the acceptance control calculation unit 116, if the load of the high-load link is 120%, may determine the regulation rate of the demand using this link so that the link load becomes equal to or smaller than the maximum load target value. The thus-determined regulation rate and post-regulation traffic volume are set in the regulation rate field and in the post-regulation traffic volume field of the demand information table. The acceptance control calculation unit 116 notifies the quality judging unit 111 of the purport that the demand information table has finished being updated.

<<Control Setup Unit>>

The control setup unit 108 receives the notification from the control calculation unit 110 (the quality judging unit 111) and, based on the control information contained in this notification, performs setting for a predetermined device connected to the IP network 1. To be specific, the control setup unit 108, if the cost value is contained in the control information, sets the cost value for each router. Further, if the demand is regulated, the control setup unit 108 sets a content of the demand regulation for the acceptance control function providing device such as the application server 21 or a session border controller. This kind of setting of the control information for the predetermined device may be automatically conducted by using the existing protocol or a dedicated protocol and may also be manually conducted.

[Operational Example]

An operational example of the service quality management device in the embodiment will hereinafter be explained with reference to FIGS. 7 to 12. At first, the initial network status and the initial demand state shown in FIG. 7 shall be assumed on the occasion of explaining the operational example.

Figure 7:
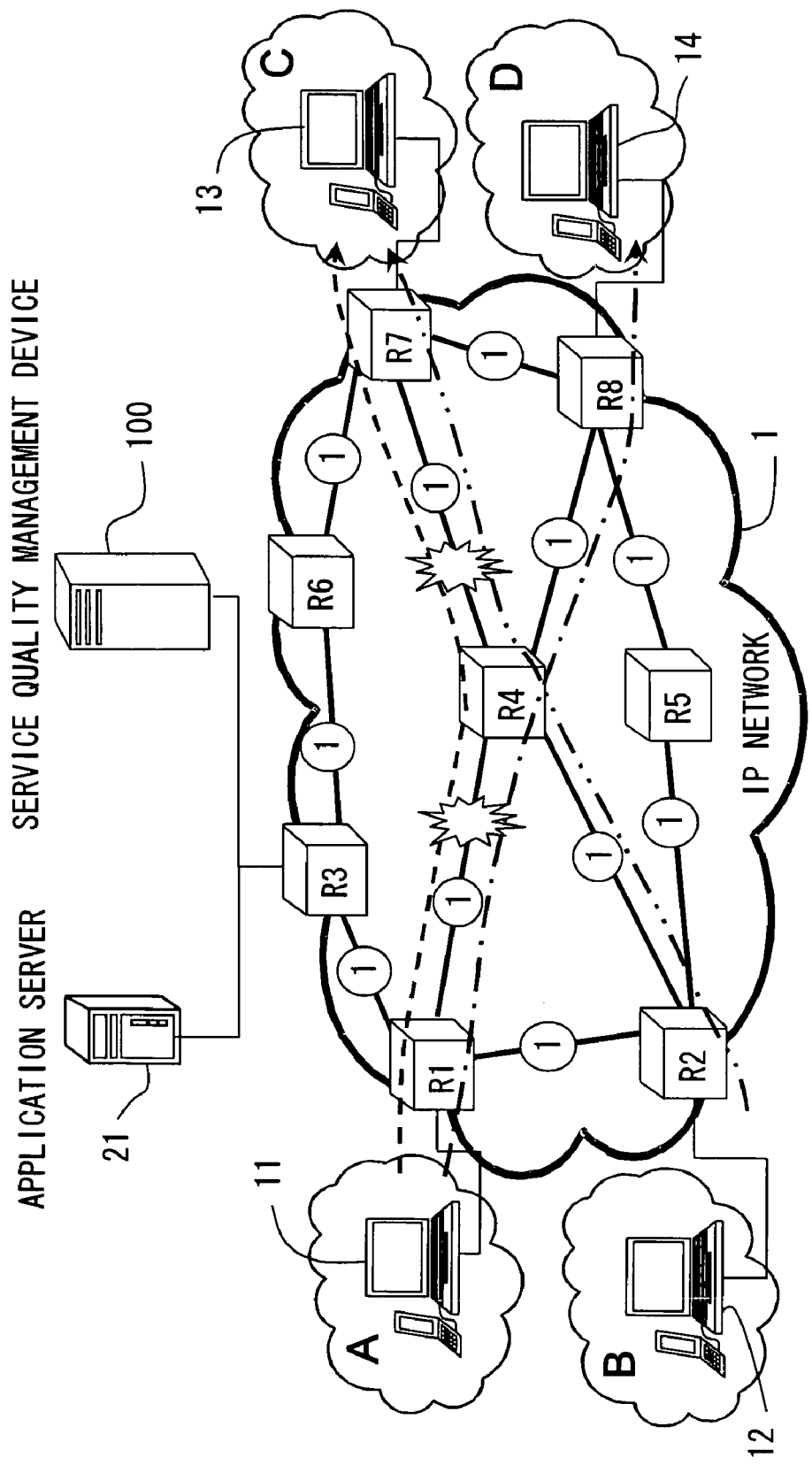
FIG. 7 is a diagram showing an example of a initial network status and an initial demand state.

In the status illustrated in FIG. 7, the service demand collecting unit 101 acquires the connection log from the application server 21, and extracts the demand information on the communication service of the quality control target from the connection log. Further, the service demand collecting unit 101 estimates the traffic volume of each demand from the extracted demand information. The thus-extracted-and-estimated demand information is set in the demand information table. Herewith, three records about the demand from the access area A to the access area C (which will hereinafter be expressed such as the demand A→C), the demand from the access area A to the access area D (which will hereinafter be expressed such as the demand A→D), and the demand from the access area B to the access area C (which will hereinafter be expressed such as the demand B→C) are set in the demand information table as shown in FIG. 5. Further, the traffic volume about each demand is set in the demand information table. In this case, the respective traffic volumes are given such as 80 Mbps for the demand A→C, 70 Mbps for the demand A→D and 60 Mbps for the demand B→C. Hereat, the values in other fields of the demand information table are set in their initial status.

Moreover, the topology collecting unit 105 acquires the network configuration information from the routers R1-R8, and sets the acquired network configuration information in the network configuration information table. In this case, link information of the links connected respectively to the routers R1-R8 are, as shown in FIG. 8, set in the network configuration information table. FIG. 8 is a diagram illustrating the network configuration information table in the initial network status, wherein only the links necessary for the following discussion are shown. In this case, all the cost values of the respective links are, e.g., set at "1" as their initial values.

The control calculation unit 110 (the quality judging unit 111), when judging that the network configuration information table is in the initial status, instructs the route calculation unit 112 to determine the route. The route calculation unit 112, with respect to each of the demands set in the demand information table, determines the route that minimizes a sum of the cost values of the individual links between the originating router and the terminating router. Herein, as illustrated in FIG. 7, a route R1-R4-R7 minimizing the sum of the cost values (a minimum value is "2") is determined as the route for the demand A→C, similarly a route R1-R4-R8 is determined as the route for the demand A→D, and a route R2-R4-R7 is determined as the route for the demand B→C. The thus-determined demand information is set in the demand information table (see FIG. 5). Thereafter, the route calculation unit 112 notifies the link load calculation unit 113 of the completion of determining the route.

The link load calculation unit 113 calculates the traffic volume of each of the links in the network configuration information table in a way that refers to the route information in the demand information table. Herein, the link 1-4 is used for the demand A→C and the demand A→D, and therefore the traffic volume of this link is calculated at 150 Mbps (=80 Mbps+70 Mbps). Further, the link 4-7 is utilized for the demand A→C and the demand B→C, and hence the traffic volume of this link is calculated at 140 Mbps (=80 Mbps+60 Mbps). As for other links, the traffic volume of the link 2-4 is calculated at 60 Mbps (the demand B→C), and the traffic volume of the link 4-8 is calculated at 70 Mbps (the demand A→D). The calculated traffic volumes are set in the network configuration information table (see FIG. 8).

The link load calculation unit 113, after setting the traffic volumes of the respective links, calculates the load of each link. Herein, as for the link 1-4, its physical bandwidth is on the order of 100 Mbps, its traffic volume is on the order of 150 Mbps, and hence the load of this link is calculated at 150%. Similarly, the load of the link 2-4 is calculated at 60%, the load of the link 4-7 is calculated at 140%, and the load of the link 4-8 is calculated at 70%. The calculated loads of the respective links are set in the network configuration information table (see FIG. 8). Thereafter, the link load calculation unit 113 notifies the optimal cost calculation unit 115 of the completion of setting the link loads.

The optimal cost calculation unit 115, when receiving the completion of setting the link loads, executes the optimal cost value judging process. In the optimal cost value judging process, the link (the link 1-4) having the maximum load is extracted from the network configuration information table, and it is judged whether this maximum load is equal to or smaller than the target value. In this case, supposing that the target value of the maximum load is, e.g., 95%, the load of the link 1-4 is 150%, and therefore the optimal cost calculation unit 115 judges that the present cost value is not the optimal cost value. From this judgment, the optimal cost calculation unit 115 executes the control to update the link cost value set in the network configuration information table into the optimal cost value. For example, if the increase threshold value is set at, e.g., 95% that is the same as the maximum load target value, the optimal cost calculation unit 115 adds "1" to the cost value of the link having the load that exceeds this increase threshold value. Herein, the link 1-4 (having the 150% load) and the link 4-7 (having the 140% load) are the links that exceed the increase threshold value, and hence the cost values thereof are changed to 2 (=1+1) (see FIG. 9). FIG. 9 is a diagram showing the network configuration information table after changing the cost values. The optimal cost calculation unit 115 requests the route calculation unit 112 to recalculate the route for each demand on the basis of this changed cost value.

Figure 10:
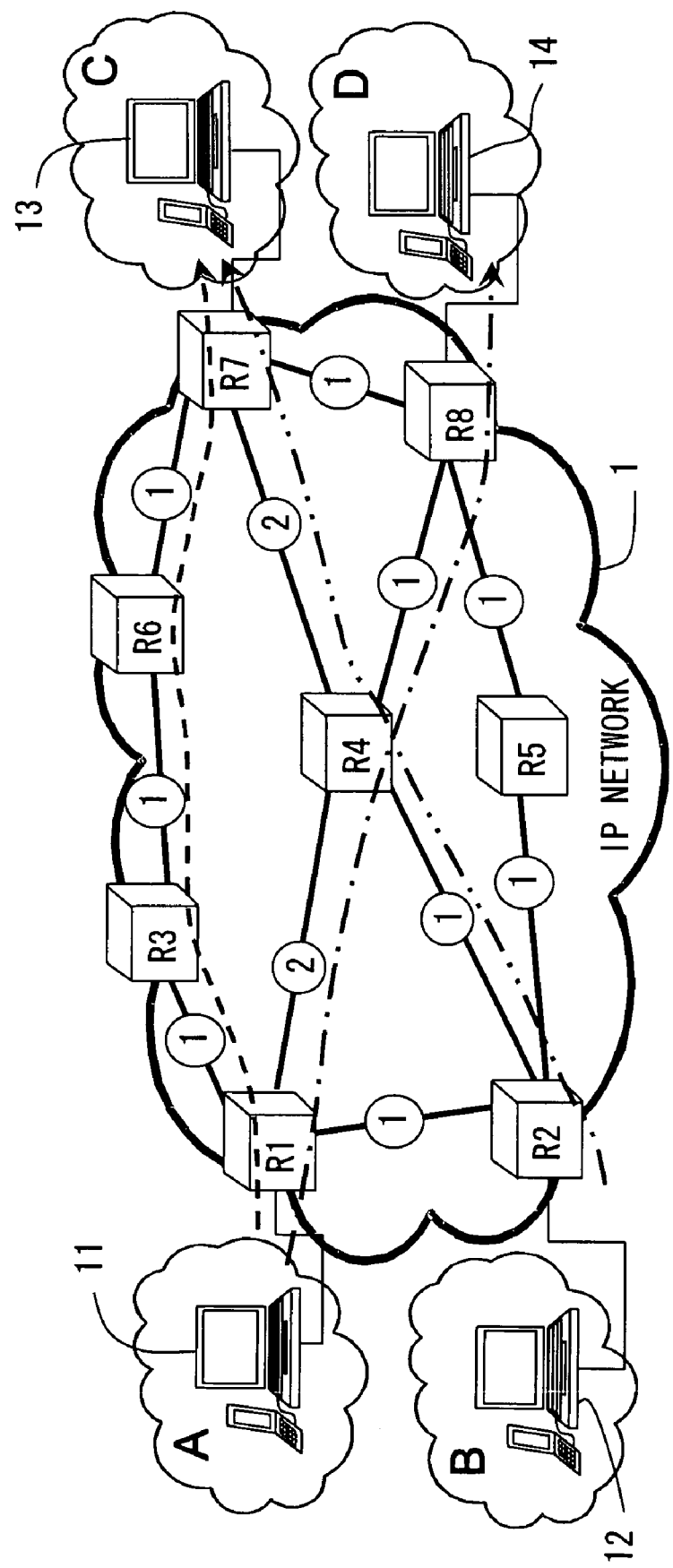
FIG. 10 is a diagram showing a concept of the network status after changing the cost value.

FIG. 10 is a conceptual diagram showing the network status after changing the cost values, wherein the network status is a status assuming such a case that the changed cost values will have been reflected in the network because of the changed cost values not yet actually being reflected in the network. As illustrated in FIG. 10, when the post-change cost values are reflected, the cost value of the link 1-4 from the router R1 to the router R4 and the cost value of the link 4-7 from the router R4 to the router R7 come to "2". The route calculation unit 112 receives the request for recalculating the route information, and recalculates the route for each of the demands set in the demand information table. Herein, as illustrated in FIG. 10, the route for the demand A→C is determined to be a route R1-R3-R6-R7 different from the route R1-R4-R7 of the last time. This is because a total cost value "3" of the route R1-R3-R6-R7 becomes the least value (a total cost value the route R1-R4-R7 of the last time is 4). Other demand routes are the same as those given last time. The recalculated route information is set in the demand information table (see FIG. 11). FIG. 11 is a diagram showing the demand information table after changing the cost values, wherein the route information of the demand from the access area A to the access area C is changed to R1-R3-R6-R7. Thereafter, the route calculation unit 112 notifies the link load calculation unit 113 of the completion of determining the routes.

The link load calculation unit 113, when receiving the notification of completion of determining the routes, recalculates the traffic volume of each of the links in the network configuration information table on the basis of the changed route information. In the post-change route information, the traffic volume of the link 1-4 that is utilized for only the demand A→D is therefore calculated at 70 Mbps, and the traffic volume of the link 4-7 that is utilized for only the demand B→C is therefore calculated at 60 Mbps. The traffic volumes of other links are likewise calculated, and the calculated traffic volumes are set in the network configuration information table (see FIG. 9). Subsequently, the link load calculation unit 113 calculates the load of each of the links. The calculated loads are set in the network configuration information table (see FIG. 9). Thereafter, the link load calculation unit 113 notifies the optimal cost calculation unit 115 of the completion of setting the link loads.

The optimal cost calculation unit 115, upon receiving the notification of completion of setting the link loads, executes the optimal cost value judging process. Herein, since the load of the link having the maximum load is 80%, it is judged that the maximum load thereof is equal to or smaller than the target value (95%) and lower than the maximum load (150%) of the last time, which is separately stored. From this judgment, the optimal cost calculation unit 115 performs, in order to attain a more optimal cost value, the control to update the post-update cost value into the more optimal cost value. Hereafter, the operations are the same as those described above, and hence the explanation is omitted. Eventually, the cost value shown in FIG. 9 is judged to be the optimal cost value. The optimal cost calculation unit 115, when judging that the cost value thus reaches the optimal cost value, notifies the quality judging unit 111 of the purport that the optimal cost value could be obtained.

The quality judging unit 111, upon receiving the notification purporting that the optimal cost value could be obtained, checks the updated network configuration information table and the updated demand information table, thereby judging that any demand with the deteriorated quality does not exist (the check may also be done once again). Herein, since there is no link of which the load exceeds the predetermined threshold value (95%), it is judged that the demand with the deteriorated quality does not exist, and the control setup unit 108 is notified of the control information containing the cost values of the respective links, the regulation rates of the individual demands and the post-regulation traffic volumes.

Figure 12:
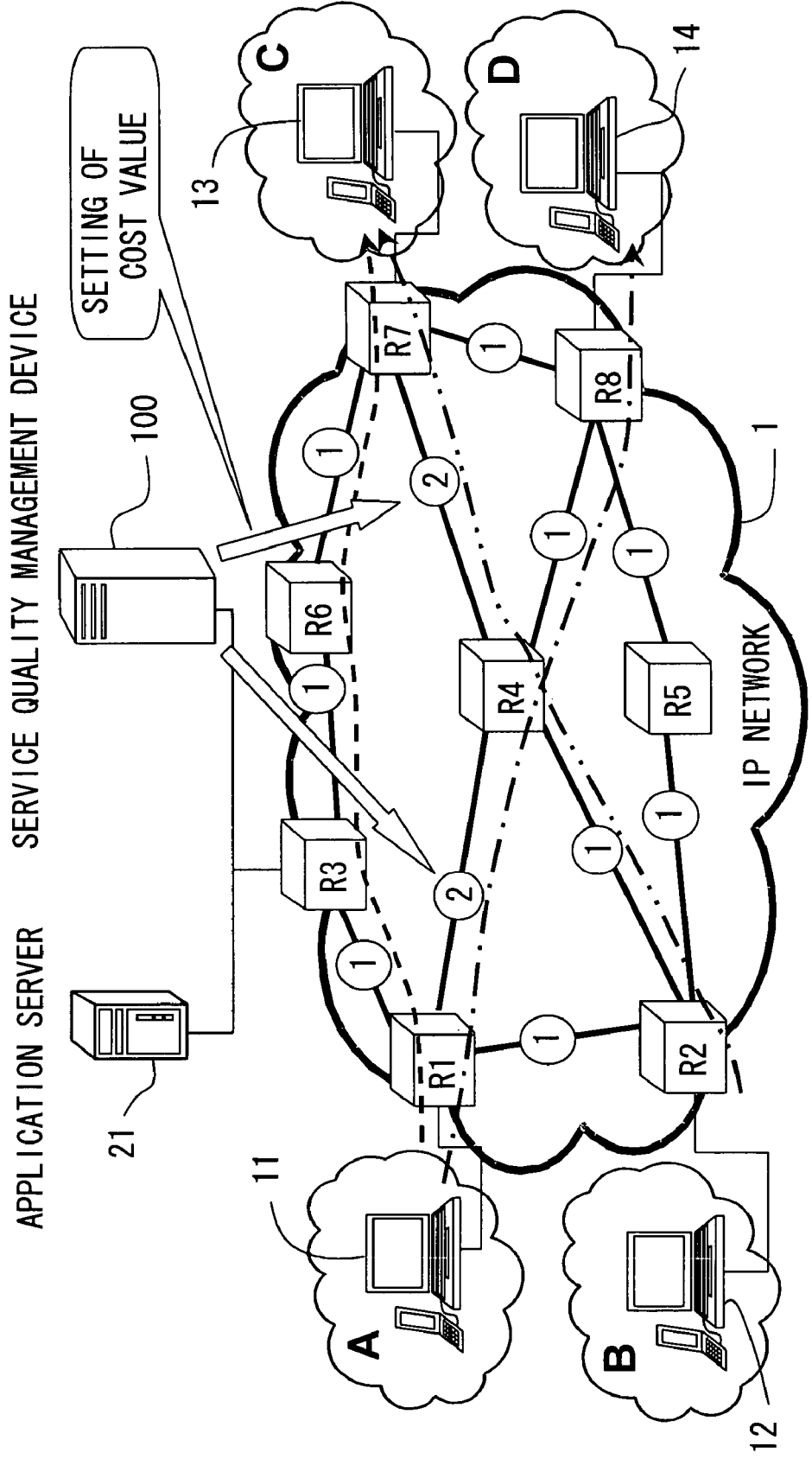
FIG. 12 is a diagram showing an example of the network status and the demand state after changing the cost value.

The control setup unit 108 receives an instruction from the quality judging unit 111 and sets, in the routers R1, R4 and R7, the changed cost values with respect to the link 1-4 and the link 4-7. With this setting, the cost values are actually reflected in the network, and a network status as shown in FIG. 12 occurs. FIG. 12 is a diagram showing the network status and the demand state after changing cost values.

An operation of the service quality management device 100 in a case where the traffic volume for the demand A→C increases up to 120 Mbps in the network status shown in FIG. 12, will hereinafter be explained with reference to FIGS. 13 through 16. FIG. 13 is a diagram showing the demand information table in which the increases in the traffic volumes are reflected.

The quality judging unit 111, when detecting that the demand information table has been updated with the reflection of the increases in the traffic volumes for the demands, instructs the route calculation unit 112 to determine the route on the basis of the changed demand information table. The route calculation unit 112 determines the route for each of the demands entered in the demand information table. In this case, the demand information becomes as illustrated in FIG. 13 without changing the route information determined by the route calculation unit 112. The route calculation unit 112 notifies the link load calculation unit 113 of the completion of determining the route.

The link load calculation unit 113 calculates the traffic volume of each of the links in the network configuration information table. Herein, the traffic volume for the demand A→C is changed, and hence the traffic volumes of the link 1-3, the link 3-6 and the link 6-7 utilized for the demand A→C are each calculated at 120 Mbps. The thus-calculated traffic volumes are set in the network configuration information table (see FIG. 14). Subsequently, the link load calculation unit 113 calculates the load of each link. Herein, the loads of the link 1-3, the link 3-6 and the link 6-7 are each calculated at 120%, and the calculated loads are set in the network configuration information table (see FIG. 14). Thereafter, the link load calculation unit 113 notifies the optimal cost calculation unit 115 of the completion of setting the link loads.

The optimal cost calculation unit 115, upon receiving the notification of completion of setting the link loads, executes the optimal cost value judging process. In the optimal cost value judging process, when judging that the maximum load is on the order of 120% and that the maximum load target value exceeds 95%, the optimal cost calculation unit 115 judges that the present cost value is not the optimal cost value. From this judgment, the optimal cost calculation unit 115 executes the control to update the link cost value entered in the network configuration information table into the optimal cost value. In this scene, however, the cost value does not reach the optimal cost value even by repeating this process by an upper limit trial count, so that the optimal cost calculation unit 115 notifies the quality judging unit 111 of the purport of being unable to obtain the optimal cost value. The quality judging unit 111, thereby, instructs the acceptance control calculation unit 116 to make the demand regulation.

The acceptance control calculation unit 116 receives the instruction of the demand regulation, and refers to the network configuration information table (FIG. 14) and the demand information table (FIG. 13), thus determining the demand A→C using the high-load link as the should-be-regulated demand. Further, the acceptance control calculation unit 116, in such a way that the maximum load of the link using the demand A→C becomes a value approximate to 95% as the maximum load target value from the present maximum load (120%), determines the regulation rate of the demand using this link to be 0.3 and the post-regulation traffic volume to be 84 Mbps. It should be noted that the present invention does not limit the method of determining the demand regulation rate and the post-regulation traffic volume. The thus-determined regulation rate and the thus-determined post-regulation traffic volume are set in the demand information table (see FIG. 13). The acceptance control calculation unit 116 notifies the quality judging unit 111 of the purport that the update of the demand information table has been finished.

Figure 16:
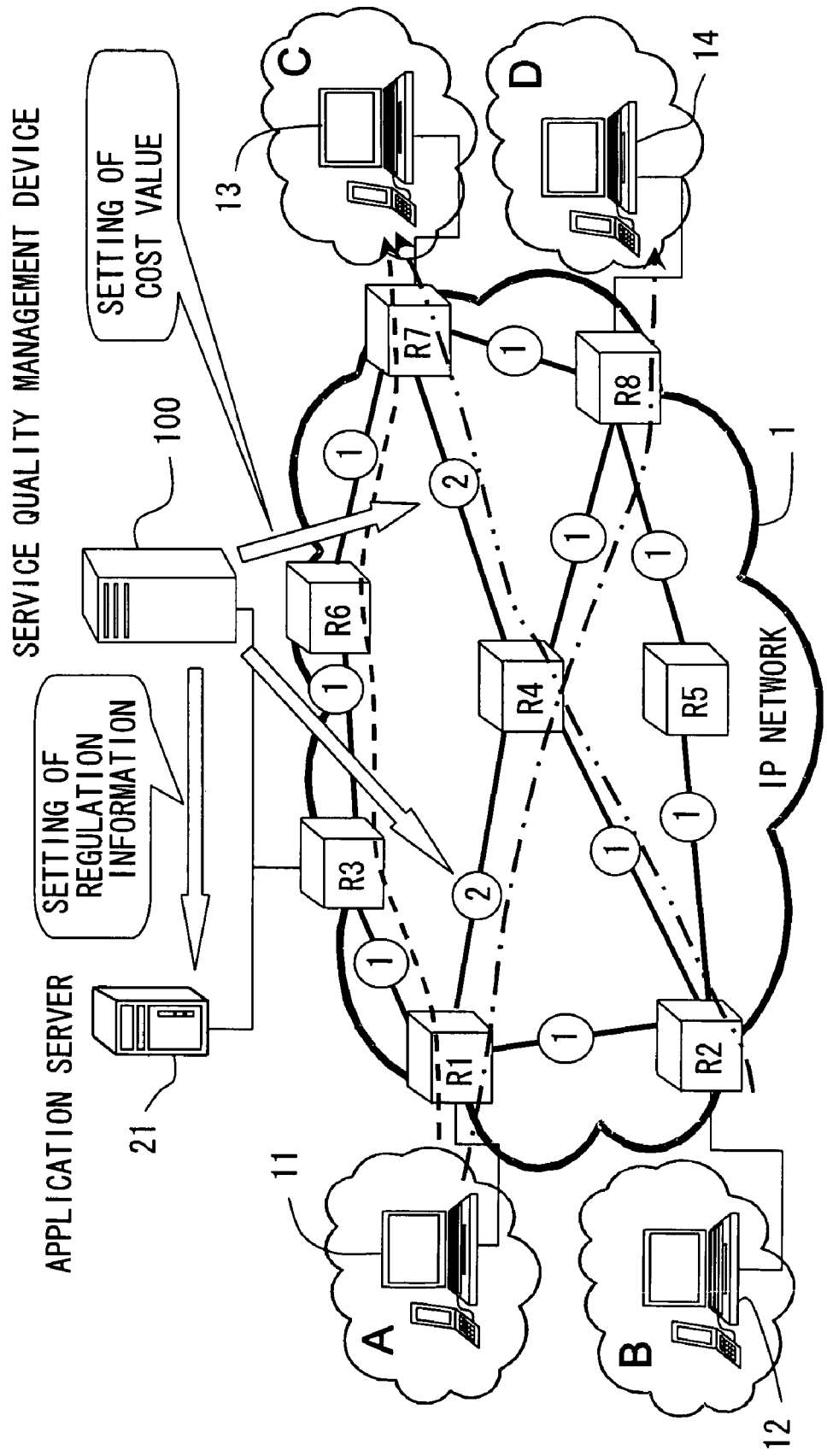
FIG. 16 is a diagram showing an example of the network status and the demand state after regulating the demand.

The quality judging unit 111, when receiving the notification of completion of the demand regulation process, instructs the route calculation unit 112 to recalculate the route on the basis of the post-regulation demand information. Hereafter, the route calculation unit 112 recalculates the route for each demand, the link load calculation unit 113 recalculates the load of each link on the basis of the post-regulation traffic volume, and the optimal cost calculation unit 115 recalculates the optimal cost value. FIG. 15 is a diagram showing the network configuration information table after regulating the demand. As illustrated in FIG. 15, it follows that resultantly the maximum load comes to 84% and all the link loads are lower than the maximum load target value "95%". The quality judging unit 111, thereby, judges that there is no demand with the deteriorated quality, and notifies the control setup unit 108 of the control information containing the each demand regulation rate, the post-regulation traffic volume, etc. The control setup unit 108 receives an instruction from the quality judging unit 111 and sets the regulation information in the application server 21. FIG. 16 is a diagram showing the network status and the demand state after the demand regulation.

<<Explanation of Flowchart>>

Figure 17:
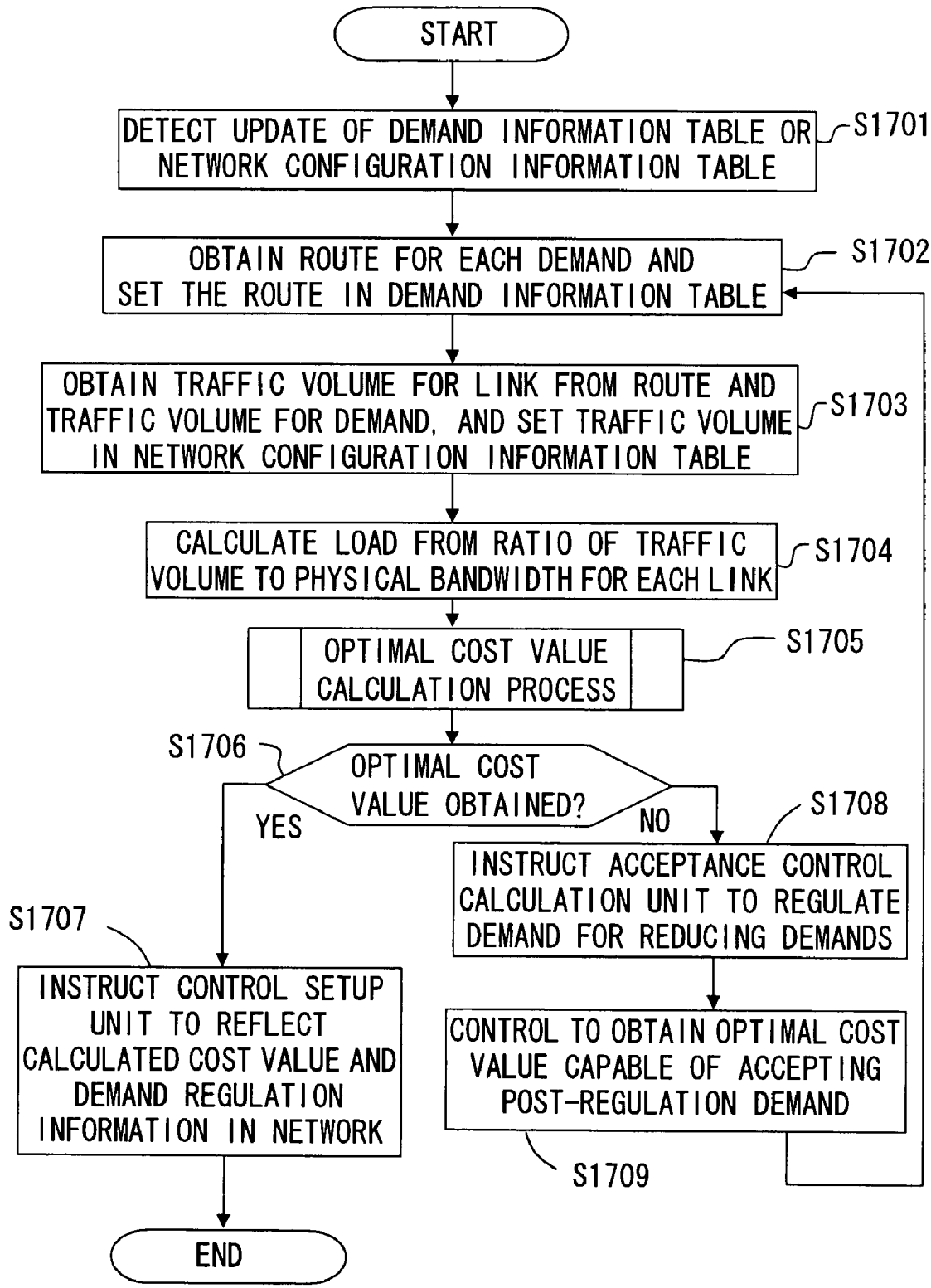
FIG. 17 is a flowchart showing an operational example of a control calculation unit.
Figure 18:
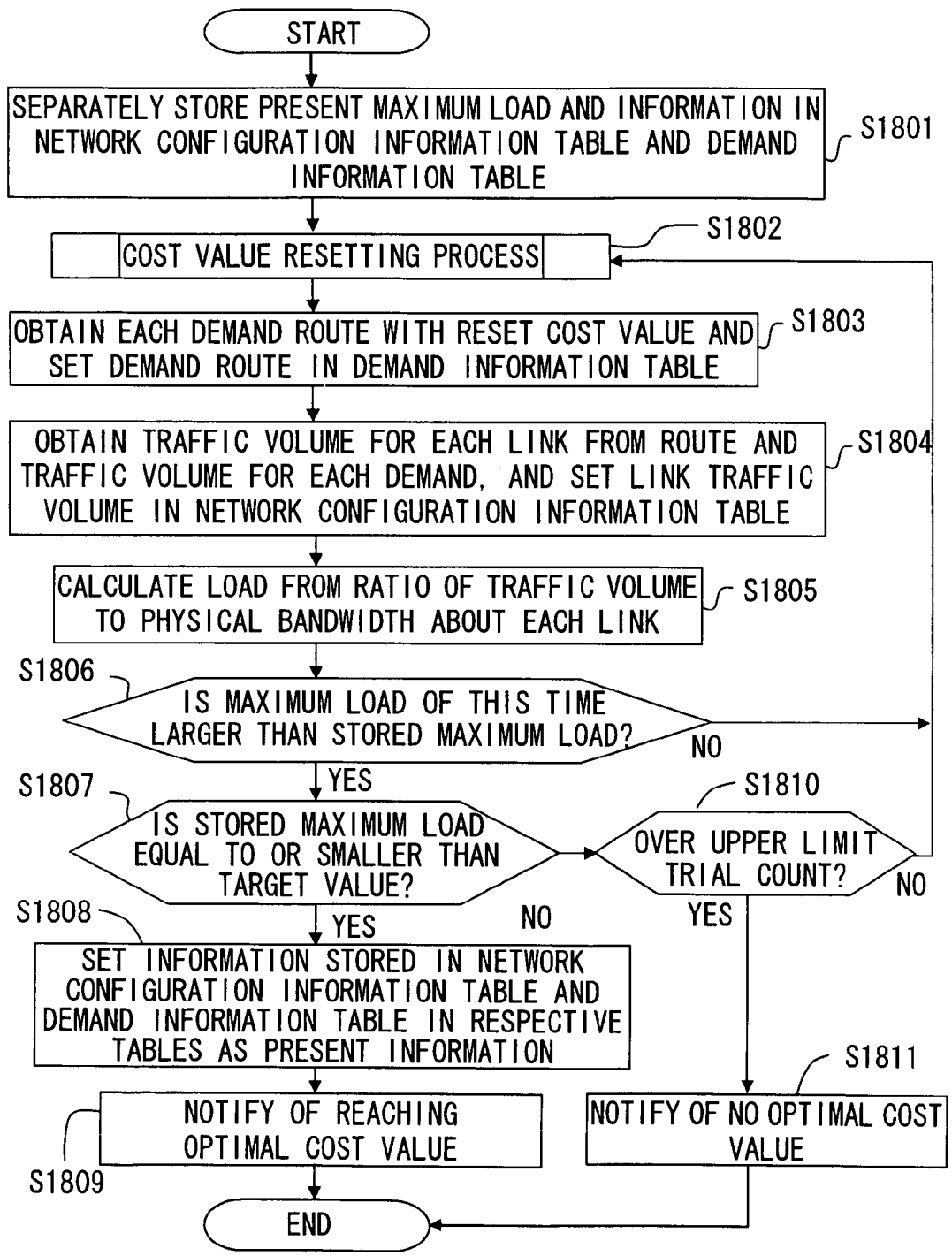
FIG. 18 is a flowchart showing an optimal cost value calculation process.
Figure 19:
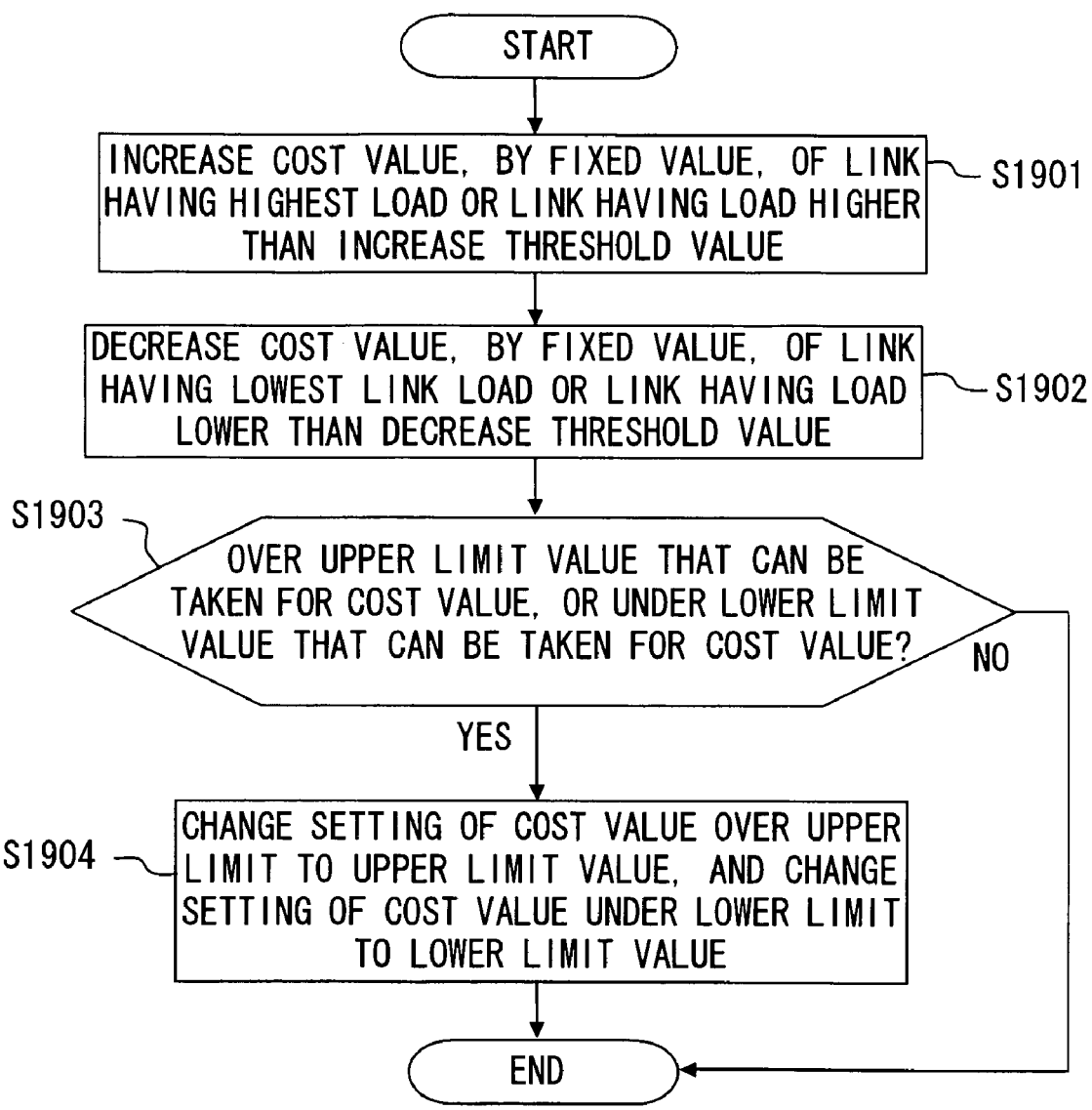
FIG. 19 is a flowchart showing a cost value resetting process.

An operational example of the service quality management device in the embodiment discussed above will hereinafter be described with reference to FIGS. 17 through 19 in a way that narrows the operation of the service quality management device down to the operation of the control calculation unit 110. FIGS. 17 through 19 are flowcharts showing the operational example of the control calculation unit 110. In these flowcharts, FIG. 18 is the flowchart of an optimal cost value calculation process in the operating flow in FIG. 17, and FIG. 19 is the flowchart of a cost value resetting process in the operating flow in FIG. 18.

The quality judging unit 111, when detecting that the demand information table or the network configuration information table has been updated (S1701), instructs the route calculation unit 112 to recalculate the route for each demand. The route calculation unit 112 receives this instruction and recalculates the routes for all the demands set in the demand information table (S1702). The route calculation unit 112 sets the route information for the calculated demands in the demand information table (S1702), and notifies the link load calculation unit 113 of the completion of determining the route.

The link load calculation unit 113 receives this notification and calculates, based on the traffic volume and the route information of each demand that are extracted from the demand information table, the traffic volume of each link (S1703). The link load calculation unit 113 subsequently calculates the load of each link on the basis of a ratio of the traffic volume to the physical bandwidth (S1704). The link load calculation unit 113 sets the calculated traffic volume and the calculated load of the link in the network configuration information table, and notifies the optimal cost calculation unit 115 of the completion of calculating the link load.

The optimal cost calculation unit 115, upon receiving this notification, executes the optimal cost value calculation process (S1705). This optimal cost value calculation process will be explained later on with reference to FIGS. 18 and 19.

The quality judging unit 111 receives the notification from the optimal cost calculation unit 115 and recognizes from this notification whether the optimal cost value could be obtained or not (S1706). Through this operation, in the case of receiving the notification purporting that the optimal cost could be obtained (S1706; YES), the quality judging unit 111 instructs the control setup unit 108 to reflect the calculated cost value and the information on the demand regulation in the network (S1707).

While on the other hand, the quality judging unit 111, in the case of receiving the notification purporting that the optimal cost value could not be obtained (S1706; NO), instructs the acceptance control calculation unit 116 to regulate the demand (S1708). The acceptance control calculation unit 116 calculates the should-be-regulated demand in the demands set in the demand information table, the regulation rate of this demand, the post-regulation traffic volume, etc, and sets the thus-calculated regulation information in the demand information table. Thereafter, the acceptance control calculation unit 116 notifies the quality judging unit 111 of the purport that the demand information table has finished being updated.

The quality judging unit 111 receives this notification and executes the control to obtain the optimal cost value capable of accepting the post-regulation demand (S1709). Namely, the quality judging unit 111 instructs the route calculation unit 112 to recalculate the route for each demand on the basis of the post-regulation demand (S1702). Hereafter, the processes as those in S1702 through S1709 described above are executed till the optimal cost value capable of accepting the post-regulation demand is obtained based on the information on the regulated demand.

Next, the optimal cost value calculation process by the optimal cost calculation unit 115 will be explained with reference to FIGS. 18 and 19. The optimal cost calculation unit 115, when receiving the notification of completion of calculating the link load, separately stores the information of the present network configuration information table and the information of the present demand information table, and further stores the link information containing the maximum load from the separately-stored network configuration information table (S1801). This intends to, if the information stored in a hereafter-process is judged to be the optimal cost value, as the new values have been already set in the network configuration information table and in the demand information table at that time, return the values to this stored information. Thereafter, the optimal cost calculation unit 115 executes the cost value resetting process (S1802).

In the cost value resetting process (see FIG. 19), the optimal cost calculation unit 115 increases the cost value, by a fixed value, of the link having the highest load or the link of which the load is higher than a predetermined increase threshold value (S1901). Further, the optimal cost calculation unit 115 decreases the cost value, by a fixed value, of the link having the lowest load or the link of which the load is lower than a predetermined decrease threshold value (S1902). At this time, the optimal cost calculation unit 115 judges if the increased or decreased cost value exceeds the upper limit value that can be taken for the cost value or if the increased or decreased cost value becomes under the lower limit value that can be taken for the cost value (S1903). If the increased or decreased cost value gets beyond a range between the upper limit value and the lower limit value (S1903; YES), the cost value is again changed to the upper limit value (S1904). If the increased or decreased cost value falls within the range between the upper limit value and the lower limit value (S1903; NO), the cost value is allowed as it is. The thus-reset cost value is set in the network configuration information table.

The optimal cost calculation unit 115, upon completing this cost value resetting process, instructs the route calculation unit 112 to recalculate the route for each demand with the reset cost value (S1803). Hereafter, the route for each demand is recalculated based on the reset cost value (S1803), and the each link traffic volume and each link load are recalculated (S1804, S1805). These processes are the same as those in S1702 through S1704 described above. The optimal cost calculation unit 115, when receiving the notification of completion of calculating the link load from the link load calculation unit 113, executes the optimal cost value judging process.

Namely, the optimal cost calculation unit 115 compares between the maximum load of the links set in the network configuration information table at that time, the maximum load of the links stored previously and the maximum load target value, thereby judges about the optimal cost value. Through this comparison, the optimal cost calculation unit 115, if the maximum load of the links set in the network configuration information table at that time is larger than the maximum load of the links stored previously (S1806; YES) and if the stored maximum load is equal to or smaller than the maximum load target value (S1807; YES), judges that the cost value of the last time is the optimal cost value. The optimal cost calculation unit 115 sets the information of the last time, i.e., the contents stored in the network configuration information table and in the demand information table, as the present information, in the respective tables (S1808), and notifies the quality judging unit 111 of the purport that the optimal cost value could be obtained (S1809).

While on the other hand, the optimal cost calculation unit 115, when judging that the maximum load of the links set in the network configuration information table at that time is equal to or smaller than the previously stored maximum load (S1806; NO), returns to the cost value resetting process (S1802). Further, the optimal cost calculation unit 115, if the maximum load of the links set in the network configuration information table at that time is larger than the previously stored maximum load (S1806; YES) but if the stored maximum load exceeds the maximum load target value (S1807; NO), judges whether the number of the cost value judging process exceeds the upper limit trial count (S1810). Through this operation, when judging that the number of the cost value judging process exceeds the upper limit trial count (S1810; YES), the optimal cost calculation unit 115 notifies the quality judging unit 111 of the purport that the optimal cost value could not be obtained (S1811). When judging that the number of the cost value judging process is equal to or smaller than the upper limit trial count (S1810; NO), the optimal cost calculation unit 115 returns to the cost value resetting process (S1802).

<Operational Effect of Embodiment>

In the service quality management device according to the embodiment of the present invention, with respect to the management target IP network 1, the quality of the predetermined service is managed based on the information acquired by the service demand collecting unit 101 and by the topology collecting unit 105.

The service demand collecting unit 101 acquires the connection log from the application server 21 and extracts the demand information on the communication service as the quality control target from this connection log. Further, the traffic volume for each demand is estimated from the extracted demand information. Moreover, the topology collecting unit 105 acquires the network configuration information from the routers R1-R8 configuring the IP network 1. The network configuration information contains information such as the topology information, the IP address associated with each link, the cost value of each link, the physical bandwidth of each link, etc.

The route calculation unit 112 determines, based on these information, with respect to each demand, the route that minimizes the sum of the cost values of the respective links between the originating router and the terminating router within the IP network 1. Subsequently, the link load calculation unit 113 calculates, based on the determined route information, the traffic volume of each of the links in the network configuration information table, and calculates the load of each link on the basis of the calculated traffic volume of the link.

The optimal cost calculation unit 115 judges about the optimal cost value on the basis of those items of information. The link having the maximum load is extracted from the now-calculated information, and it is judged whether this maximum load is equal to or smaller than the target value. From this judgment, if the maximum load exceeds the target value, the present cost value is judged not to be the optimal cost value, and the cost value is changed so that the now-calculated cost value of the link becomes the optimal cost value. The route calculation unit 112 is again requested to recalculate the route for each demand with the changed cost value.

Hereafter, the route calculation unit 112 recalculates the route information on the basis of the changed link cost value, the link load calculation unit 113 recalculates the traffic volume of each of the links in the network configuration information table on the basis of the changed route information, and the optimal cost calculation unit 115 executes the optimal cost value judging process on the basis of these respective items of recalculated information. With repetition of these processes, the link cost value capable of accepting all the demands is calculated. Even when these processes are executed by the upper limit trial count, however, if it is judged that the cost value does not yet reach the optimal cost value, the quality judging unit 111 is notified of the purport that the optimal cost value could not be obtained.

Herein, if unable to obtain the optimal cost value, the acceptance control calculation unit 116 determines the should-be-regulated demand and the regulation rate thereof. Hereafter, based on the thus-determined post-regulation demand information, the route calculation unit 112 recalculates the route information, the link load calculation unit 113 recalculates the traffic volume of each link, and the optimal cost calculation unit 115 executes the optimal cost value judging process on the basis of the respective items of recalculated information. The optimal cost value enabling all the demands containing the regulated-demand to be useful is thereby determined.

The quality judging unit 111, in both of a case where the demand is regulated and a case where the demand is not regulated, upon receiving the notification showing the purport of having reached the optimal cost value, judges that there is no demand with the deteriorated quality, and notifies the control setup unit 108 of the control information containing the optimal cost value of each link, the regulation rate of each demand and the post-regulation traffic volume. The control setup unit 108 sets these predetermined items of information in the routers R1, R4 and R7 configuring the IP network 1 and in the application server.

Thus, in the present invention, the quality management is made based on the information acquired by the service demand information collecting unit 101 and by the topology collecting unit 105, and hence the quality of the specified communication service desired to be managed can be automatically managed.

Moreover, in the present invention, each link load is judged by use of the packet route for every demand that is determined based on the same information as those by a routing algorithm actually executed by the router, and it is therefore possible to actualize the highly accurate judging of the service quality. Moreover, though the service provider or the network provider have hitherto been required to monitor the quality of service of each session, the service quality management device in the embodiment is capable of automatically managing the quality of service, thereby enabling the man-hour of such operations to be decreased and a cost for the operation to be reduced.

Further, on the occasion of determining the packet route for each demand, the optimal cost value is determined and is set in each router. With this scheme, the service quality management device in the embodiment is capable of reflecting the information with the managed service quality in the network in a way that manages the quality of service so as to prevent the deterioration of the quality of the communication service provided on the network, therefore capable of reducing the number of man-hour for the management of the network and further capable of maintaining the quality of service while effectively utilizing the network resources.

Furthermore, the service quality management device in the embodiment, if unable to obtain the link cost value capable of accepting all the demands, regulates the predetermined demand at the predetermined regulation rate, thereby obtaining the link cost value capable of accepting all the demands containing the regulated demand. Even after making the service regulation, the high quality of service can be maintained with respect to all the demands in a way that effectively utilizes the network resources. Then, the demand regulation information can be also automatically set in the network devices, thereby leading to the reduction in the number of man-hour for the management.

<Modified Example>

The embodiment discussed above is that the control setup unit 108 automatically sets, in the network devices, the optimal cost value and the demand regulation information that are calculated by the control calculation unit 110. The service quality management device 100 according to the present invention is not limited to this configuration and can be operated as a desktop simulation device before being connected to the IP network 1. In this case, the demand information table set by the service demand information collecting unit 101 and the network configuration information table set by the topology collecting unit 105, may each be manually set by an operator, while the control setup unit 108 may also be controlled so as not to operate.

Even if done so, other functional units are still operable, so that the optimal link cost value and the demand regulation information are determined in the same way as the above and are set in the respective tables. This scheme, owing to the simulation before operating for the service, enables the setting in the respective routers and in the application server. Note that the service quality management device 100 in the embodiment may execute the control so that the optimal cost calculation unit 115 does not operate as well as the control setup unit 108 etc, and may only judge about the quality of each demand.

Moreover, in the service quality management device 100 in the embodiment, if the operator inputs a predicted value of the service demand and sets an execution schedule (e.g., the operation starts on Mar. 20, 2006) for this demand, the control calculation unit 110 may operate in accordance with this schedule. FIG. 20 is a diagram showing the demand information table in such a modified example. The quality management based on the demand information according to the operation month can be conducted beforehand by using this demand information table. In this case, the service quality management device 100 operates as the simulation device till the date set in the execution schedule as described above (the control is done so as not to operate the control setup unit 108), and the optimal link cost value etc calculated in simulation may be set in the network devices on the date.

<Others>

The disclosures of Japanese patent application No. JP2006-087956, filed on Mar. 28, 2006 including the specification, drawings and abstract are incorporated herein by reference.

What is claimed is:

1. A service quality management device for managing a quality of a communication service provided on a network as management target, comprising:

a service information acquiring unit to acquire service information containing information about each of sessions for the communication service;

a network configuration information acquiring unit to acquire network configuration information about the network;

a regulation unit to determine at least one of the sessions as a session of which acceptance should be regulated;

an information acquiring unit to acquire a traffic volume of each of the sessions on the basis of the service information and to reacquire a traffic volume regulated with respect to the session of which acceptance should be regulated;

a route determination unit to extract, for each of the sessions, a link configuration between relay devices connecting each of session-connected terminals to the network and a cost value of each of links in the network from the service information and from the network configuration information, and to determine a packet route for each of the sessions on the basis of the extracted link configuration and the extracted cost value of each of the links;

a traffic calculation unit to calculate a traffic volume of each of the links in the network on the basis of the traffic volume of each of the sessions and the packet route for each of the sessions;

a load calculation unit to calculate load of each of the links on the basis of the traffic volume of each of the links;

a quality judging unit to judge that a quality of service actualized by the session is deteriorated if the load of at least one link in the links included in the packet route for the session exceeds a predetermined threshold value; and a changing unit to change, if the quality of service of even any one of the sessions is judged to be deteriorated, at least one of the cost values of each of the links, and to determine an optimal cost value of each of the links so that the qualities of services of all the sessions are not deteriorated by making the quality judging unit judge the quality of service again on the basis of the regulated traffic volume and the changed cost value.

2. The service quality management device according to claim 1, further comprising a setting unit to set the optimal cost value of each of the links and regulation information about the session of which acceptance should be regulated in predetermined devices in the network.

3. The service quality management device according to claim 1, wherein the service information acquiring unit acquires the service information from a connection log outputted by a server that provides the communication service.

4. The service quality management device according to claim 1, wherein the service information acquiring unit acquires the service information from a service request packet transmitted to a server providing the communication service.

5. The service quality management device according to claim 1, wherein the network configuration information acquiring unit acquires the network configuration information from a relay device disposed in the network.

6. A service quality control method of controlling a quality of a communication service provided on a network as management target, comprising:

acquiring service information containing information about each of sessions for the communication service;

acquiring network configuration information about the network;

acquiring a traffic volume of each of the sessions on the basis of the service information;

extracting, for each of the sessions, a link configuration between relay devices connecting each of session-connected terminals to the network and a cost value of each of links in the network from the service information and from the network configuration information;

determining a packet route for each of the sessions on the basis of the extracted link configuration and the extracted cost value of each of the links;

calculating a traffic volume of each of the links in the network on the basis of the traffic volume of each of the sessions and the packet route for each of the sessions;

calculating load of each of the links on the basis of the traffic volume of each of the links;

judging that a quality of service actualized by the session is deteriorated if the load of at least one link in the links included in the packet route for the session exceeds a predetermined threshold value;

changing, if the quality of service of even any one of the sessions is judged to be deteriorated, at least one of the cost values of each of the links;

determining at least one of the sessions as a session of which acceptance should be regulated;

reacquiring a traffic volume regulated with respect to the session of which acceptance should be regulated; and determining an optimal cost value of each of the links so that the qualities of services of all the sessions are not deteriorated by judging the quality of service again on the basis of the regulated traffic volume and the changed cost value.

7. The service quality control method according to claim 6, further comprising setting the optimal cost value of each of the links and regulation information about the session of which acceptance should be regulated in predetermined devices in the network.

* * * * *